United States Patent
Minato et al.

(10) Patent No.: US 7,526,193 B2
(45) Date of Patent: Apr. 28, 2009

(54) OBJECT DETERMINING DEVICE AND IMAGING APPARATUS

(75) Inventors: Yoshihisa Minato, Kyoto (JP); Takuya Tsuyuguchi, Kyoto (JP); Fumikazu Imae, Kyoto (JP); Masashi Yamamoto, Kyotanabe (JP)

(73) Assignee: Omron Corporation, Kyoto (JP)

( * ) Notice: Subject to any disclaimer, the term of this patent is extended or adjusted under 35 U.S.C. 154(b) by 189 days.

(21) Appl. No.: 10/564,392

(22) PCT Filed: Jul. 14, 2004

(86) PCT No.: PCT/JP2004/010055

§ 371 (c)(1),
(2), (4) Date: Jun. 5, 2006

(87) PCT Pub. No.: WO2005/006072

PCT Pub. Date: Jan. 20, 2005

(65) Prior Publication Data

US 2007/0110422 A1    May 17, 2007

(30) Foreign Application Priority Data

Jul. 15, 2003 (JP) ............................. 2003-197404
Sep. 10, 2003 (JP) ............................. 2003-318701

(51) Int. Cl.
G03B 3/10 (2006.01)
(52) U.S. Cl. .................... 396/123; 382/115; 382/118
(58) Field of Classification Search ................ 382/115, 382/118, 104; 60/382, 550; 396/123
See application file for complete search history.

(56) References Cited

U.S. PATENT DOCUMENTS

| 5,410,225 A | * | 4/1995 | Ishii et al. ................. 348/229.1 |
| 6,108,437 A | * | 8/2000 | Lin ............................. 382/118 |
| 6,301,440 B1 | * | 10/2001 | Bolle et al. .................. 396/128 |
| 6,463,163 B1 | * | 10/2002 | Kresch ........................ 382/103 |
| 6,940,545 B1 | * | 9/2005 | Ray et al. ................. 348/222.1 |
| 2001/0036298 A1 | * | 11/2001 | Yamada et al. ............. 382/118 |
| 2003/0071908 A1 | * | 4/2003 | Sannoh et al. .............. 348/345 |
| 2003/0161506 A1 | * | 8/2003 | Velazquez et al. .......... 382/118 |
| 2006/0284991 A1 | * | 12/2006 | Ikeda ..................... 348/223.1 |

FOREIGN PATENT DOCUMENTS

JP   2003-107335 A   4/2003
JP   2003-189296 A   7/2003

OTHER PUBLICATIONS

Chinese Office Action dated Mar. 7, 2008.
Liang et al.; "A Survey of Human Face Detection," Chinese Journal of Computers, China Academic Journal Electronic; vol. 25, No. 5; May 2002; pp. 449-452.

* cited by examiner

Primary Examiner—Melissa J Koval
Assistant Examiner—Michael A Strieb
(74) Attorney, Agent, or Firm—Dickstein Shapiro LLP

(57) ABSTRACT

Face detection is executed only on an image imaged based on an arbitrary (predetermined) focal point information defined in advance. In face detection, the face of a person is detected based on a relative value of statistics in a plurality of characteristic regions produced by contour or parts of the face of the person. Thus, even if the face in the image used for face detection is blurred, the statistics in a certain region can be acquired, and thus such face is detectable. Therefore, the primary subject to be focused can be rapidly detected without performing focal point control at a stage of preliminary imaging in the imaging apparatus.

19 Claims, 29 Drawing Sheets

OBJECT DETERMINING DEVICE AND IMAGING APPARATUS

BACKGROUND OF THE INVENTION

1. Field of the Invention

The present invention relates to a technique that is effective in application to a device (digital still camera, digital video camera and the like) for imaging a still image or a moving image.

2. Description of the Related Art

A technique such as an auto focus for focusing on a specific subject, an automatic exposure control for performing exposure control in accordance with the specific subject and the like is installed in the imaging apparatus. Conventionally, auto focus or automatic exposure control is performed on the subject at a specific position (e.g., middle point within a frame) defined in advance within the frame. However, the subject the user is interested in, that is, the subject to be the object of auto focus or automatic exposure control may not necessarily be positioned at the middle of the frame depending on the preference of framing of the user. In this case, the user operates the imaging apparatus so that the relevant subject shifts to a specific position within the frame, and after performing auto focus or automatic exposure control thereat, must perform framing according to preference, which process is a troublesome task.

A technique for solving the above problem includes a technique for performing imaging in advance (this imaging is hereinafter referred to as "preliminary imaging") to specify the object to be focused or the object on which to perform exposure control. In the technique for performing preliminary imaging, the object to be focused or performed with exposure control is specified using an image imaged in the preliminary imaging.

A specific example of the technique for performing the preliminary imaging includes a technique for focusing on the face of a person within the image irrespective of the position/range of the person in the field (in the image) (see e.g., Japanese Patent Application No. 107335 (2003)). Similarly, the technique for performing the preliminary imaging also includes a technique for performing an appropriate exposure on the person in the image irrespective of the position/range of the person in the image (see Japanese Patent Application No. 107555 (2003)).

In the above prior arts, if a plurality of faces are detected in the screen, the automatic focusing control is performed with at least one part of the face close to the central part as the distance measuring area. Similarly, a technique of when a plurality of faces are detected in the screen includes a technique for automatically having everyone in the screen in a depth of field (Japanese Patent Application No.092699 (2003)).

SUMMARY OF THE INVENTION

However, the prior art techniques have the following problems. That is, if the focal point is originally shifted with respect to the primary subject in the image obtained through the preliminary imaging, the face or the primary subject may not be detected.

As a method of solving such problem, a method of performing the focal point control at the stage of preliminary imaging to image an image in which the primary subject is detectable is provided. Specifically, a method of detecting the primary subject from a plurality of images produced by the preliminary imaging is provided. In this method, the plurality of images focused on a plurality of focal points is imaged in the preliminary imaging. The face detection of the primary subject is performed from the plurality of images. Thus, even if the face of the primary subject cannot be detected as it is blurred in a certain image, the face of the primary subject can be detected in another image.

However, in such method, the face detection must be implemented for a plurality of images. Further, the focal point must be adjusted in order to image a plurality of images focused on a plurality of focal points in the imaging apparatus. Thus, compared to the conventional method, time is required for the focusing process.

The present invention first aims to solve the above problem by detecting at high speed the primary subject serving as an object to be focused or on which to perform exposure control without performing focal point control at the stage of preliminary imaging in the imaging apparatus.

Determining the object to be focused or on which to perform exposure control by performing preliminary imaging as described above rises the following problems. The number of faces of people that are detected in the image in the preliminary imaging may not be only one. If the number of faces of the people that are detected is one, focusing and exposure control are unconditionally performed on the relevant face. However, when a plurality faces of the people are detected in the image in the preliminary imaging, a sufficient consideration has not been made as to which face the focusing or exposure control should be performed on. For instance, under the principle that the face of the person present at the middle of the frame is the face desired as the subject by the user, a technique of performing focusing or exposure control on the face of the person closest to the middle of the frame is provided. However, such technique is based on the assumption that the face most desired as the subject by the user is only one in the frame, and cannot accurately respond to a case in which there are a plurality of faces in the frame that are comparably desired as the subject.

The present invention also aims to solve the above problem by providing a device for determining whether or not focusing or exposure control should be performed on one of the faces when a plurality of faces are detected in the preliminary imaging.

In the following description, the skin color refers to the skin color of every people, and is not limited to the skin color of a specific race.

The present invention has the following configuration to achieve the first aim. The first embodiment of the present invention is an object determining device that includes a face detecting means and a determining means.

The face detecting means detects the face of a person from the image to be processed with the image imaged based on an arbitrary focal point information as the image to be processed. The arbitrary focal point information may be predetermined focal point information. The predetermined focal point information is focal point information defined to be one in advance and is not focal point information that changes dynamically. Thus, in an apparatus for imaging the image based on the predetermined focal point information, that is, the imaging apparatus for imaging the image input to the face detecting means, the focal point control is desirably performed in advance based on the predetermined focal point information. For instance, control of focus lens and the like is desirably performed in advance based on the focal point information.

When the imaging apparatus is controlled in advance, the focal point information does not need to be performed anew when imaging the image input to the face detecting means.

Therefore, the time required for imaging the image input to the face detecting means is shortened.

However, in the image imaged based on the predetermined focal point information, the subject in the image may not be focused. Thus, the face that is to be originally detected may be imaged blurred and unclear in the image input to the face detecting means.

Thus, the face detecting means of the first embodiment of the present invention is configured so as to also detect the image of the face that is imaged unclear. Specifically, the face detecting means detects the face of a person based on a relative value of the statistics in a plurality of characteristic regions produced by the contour or parts of the face. That is, the face detecting means of the first embodiment of the present invention performs detection of a face based not on the shape configured by the edge and the like in the image but based on the relative value of the statistics in the characteristic region. The statistic in the characteristic region is a value of sum, average, variance and the like of a pixel value within the characteristic region. The relative value is a value of ratio, difference, statistical distance, mutual entropy and the like. The detection of the face may be implemented based on the relative value of the gray value in the characteristic region.

In the image that is imaged unclearly, it is difficult to recognize the shape configured by edges and the like. However, the statistic in a certain characteristic region may be acquired even with the image that is imaged unclearly. Thus, the face detecting means of the first embodiment of the present invention can detect the face of a person from the image (image to be processed) imaged based on the predetermined focal point information.

The detecting means determines the subject to be focused and/or the subject on which to perform exposure control when performing imaging based on the face detected by the face detecting means. The subject to be focused and the subject on which to perform exposure control when performing imaging may be the face detected by the face detecting means or may be each part (eye, nose, mouth, ear, forehead etc.) constituting the detected face.

In the object determining device according to the first embodiment of the present invention configured as above, the face of a person is detected from the image imaged based on the arbitrary focal point information (predetermined focal point information), and the subject to be focused or the subject on which to perform exposure control is determined based on the detected face. Thus, as described above, the image imaged based on the predetermined focal point information can be imaged at high speed by having the imaging apparatus performed with focal point control according to the predetermined focal point information. The face of a person is detected from such image, and the subject to be focused or the subject on which to perform exposure control is determined.

Thus, according to the object determining device according to the first embodiment of the present invention, the primary subject (face, parts of face etc.) to be focused or on which to perform exposure control can be detected and determined at high speed without performing focal point control at a stage of preliminary imaging in the imaging apparatus.

According to the object determining device according to the first embodiment of the present invention, the face can be detected from a fewer preliminary imaged image even if configured so as to acquire a plurality of images through preliminary imaging in the imaging apparatus. Therefore, the time required for preliminary imaging or the time required for face detection can be reduced.

The face detecting means according to the first embodiment of the present invention may be configured so as to detect the face of the person in the following way. That is, the emphasis region in the imaged image is first determined. The emphasis region is a region same as or smaller than the imaged image.

The face detecting means derives the relative value of the statistics of the first region and the second region, which are characteristic regions within the emphasis region. The first region and the second region are each different regions within the emphasis regions.

The face detecting means decides whether or not the face of the person is included in the emphasis region based on the relative value of the derived statistics. The face detecting means may be configured so as to perform such decision by comparing a certain threshold value and a relative value of the statistics. Further, the face determining means may be configured so as to perform such decision by referring to a table for storing the relative value of the statistics and a value indicating whether or not the face of the person is included in the emphasis region when the relative value of certain statistics is calculated in correspondence to each other. The face detecting means detects the face of the person according to such decision.

The determining means according to the first embodiment of the present invention may be configured so as to determine the subject to be focused or the subject on which to perform exposure control in the following way when the face detecting means detects a plurality of faces. That is, the determining means determines one face based on the image information of each of the plurality of faces detected by the face detecting means. The image information of the face indicates the information obtained from the image of the face such as orientation of the face, the size of the image of the face, the position of the face in the image, the density of the neighboring faces and the like.

The density of the neighboring faces is indicated by, for example, a number of faces present in a constant perimeter (constant neighboring region) of the detected face. If such value is large, multiple faces are present in the perimeter, which indicates that the person whose face is detected is included in a group. If the value is small, the face present in the perimeter is few, which indicates that the person whose face is detected is alone or with a few people at a location away from the group.

The determining means determines the subject to be focused and/or the subject on which to perform exposure control based on the determined face.

In the first embodiment of the present invention configured as above, the subject to be focused and/or the subject on which to perform exposure control based on one of the faces is determined based on the image information of a plurality of faces. Thus, even if a plurality of faces are detected by the face detecting means, one of the faces is selected from a plurality of faces by the determining means without the user performing the selection.

The determining means according to the first embodiment of the present invention may be configured to compare the sizes of the image of each of a plurality of faces and determine the subject to be focused and/or the subject on which to perform exposure control based on the face of largest size.

The face of the largest size out of a plurality of faces is generally positioned closest to the imaging apparatus. Thus, according to the first embodiment of the present invention configured as above, the face at a position closest to the imaging apparatus is determined and the subject to be focused or the subject on which to perform exposure control is determined based on the relevant face.

Since the image tends to blur the closer the object is positioned in front of the imaging apparatus, the object positioned closer to the imaging apparatus must generally be focused. Further, the face positioned closer to the imaging apparatus has a higher possibility (hereinafter expressed as "importance of the face") of including the primary subject or being the primary subject than the face positioned behind the face closer to the imaging apparatus. With regards to such aspect, determining the subject to be focused or the subject on which to perform exposure control based on the face positioned closest to the imaging apparatus is effective.

The determining means according to the first embodiment of the present invention may be configured to calculate points for each face based on one of or a plurality of the orientation of the face, the size of the face, the position in the image, or the density of the neighboring faces. Here, the determining means use the calculated points as the image information.

In the object determining device according to the first embodiment of the present invention configured as above, each face is evaluated by the orientation of the face, the size of the face, the position in the image, the density of the neighboring faces and the like. For instance, the face facing the front is evaluated to have higher importance of the face than the face looking away. The large face is evaluated to have higher importance of the face than the small face. The face in which the position in the image is close to the middle is evaluated to have higher importance of the face than the face positioned at a region distant from the middle. The face in which the density of the neighboring faces is high is evaluated to have higher importance of the face than the face in which the density of the neighboring faces is low. The high-low evaluation may be set in any manner by the designer or the user.

According to the first embodiment of the present invention configured as above, the face with high points, that is, high importance is selected according to the setting of high-low evaluation.

The determining means according to the first embodiment of the present invention may be configured to determine the subject to be focused and/or the subject on which to perform exposure control in a following manner when a plurality of faces of the people are detected by the face detecting means. That is, the determining means determines the subject to be focused and/or the subject on which to perform exposure control according to the result distance measured with respect to a plurality of real faces detected by the face detecting means. The distance measuring may, for example, be performed with a distance measuring means or a distance measuring device arranged in the imaging apparatus or may be performed with a distance measuring means arranged in the object determining device. The distance measurement must measure the distance between the imaging apparatus and the real face, and thus the distance measurement is not performed by the distance measuring means arranged in the object determining device if the imaging apparatus and the object determining device are apart.

The distance measurement is performed by projecting infrared radiation on the real face (active method). The distance measurement may be applied with a method (e.g., passive method) other than the active method. The determining means determines the subject to be focused and/or the subject on which to perform exposure control based on the face which distance away is the smallest. Thus, the effect of determining the subject to be focused and the subject on which to perform exposure control based on the face in which the distance between the imaging apparatus and the real face is the smallest is as explained above.

A second embodiment of the present invention is an imaging apparatus that includes an imaging means, the face detecting means, the determining means, the information acquiring means, and the image storage means.

The imaging means images an image based on the predetermined focal point information, or the focal point information and/or exposure control information acquired by the information acquiring means. The predetermined focal point information is focal information defined as one in advance and not focal point information that changes dynamically. The focal point information acquired by the information acquiring means is not focal point information defined in advance but focal point information that changes dynamically. More specifically, they are focal point information determined by the face detecting means, the determining means, and the information acquiring means. That is, the subject to be focused is determined based on the detected face, and they are the focal point information for focusing on the determined subject.

The imaging means is controlled to a state of acquiring the image based on the predetermined focal point information when the focal point information is not output from the information acquiring means. If instruction for imaging is provided, the image based on the predetermined focal point information is acquired. When the focal point information or the exposure control information is output from the information acquiring means, the imaging means is controlled to a state of acquiring the image based on such information. The imaging means acquires the image based on the focal point information or the exposure control information if instruction for imaging is provided.

The face detecting means detects the face of a person based on the relative value of the statistics in a plurality of characteristic regions produced by the contour or parts of the face of a person from the image to be processed based on the predetermined focal point information. The determining means determines the subject to be focused and/or the subject on which to perform exposure control when performing imaging based on the face detected by the face detecting means. The face detecting means and the determining means according to the second embodiment of the present invention basically has a configuration or operation similar to the face detecting means and the determining means according to the first embodiment of the present invention.

The information acquiring means acquire the focal point information for focusing on the subject determined by the determining means and/or the exposure control information for performing the exposure control with the subject determined by the determining means as the object.

The image storage means stores the image imaged by the imaging means based on the focal point information and/or exposure control information acquired by the information acquiring means. That is, when the focal point information or the exposure control information are acquired by the information acquiring means, the imaging means perform the focal point control or the exposure control based on the focal point information or the exposure control information. The subject determined by the determining means is focused through the focal point control. The exposure control according to the subject determined by the determining means is performed through the exposure control. The imaging means then performs imaging and the image storage means stores the data of the imaged image.

The second embodiment of the present invention may be configured so as to further include a distance measuring means for measuring the distance from the imaging apparatus to an arbitrary subject. When the information acquiring means is configured so as to acquire the focal point information by measuring the distance between the real subject and the imaging apparatus, the information acquiring means may be an alternative means of the distance measuring means. In this case, the information acquiring means operates as the distance measuring means.

When the second embodiment of the present invention is configured as above, when the face detecting means detect a plurality of faces of the people, the determining means is configured so as to determine the subject to be focused and/or the subject on which to perform exposure control based on the face in which the distance is the smallest according to the result of the distance measurement made by the distance measuring means on each of a plurality of real faces.

In the second embodiment of the present invention, the object determining device or the first embodiment of the present invention may be arranged in the imaging apparatus. Thus, effects similar to the first embodiment of the present invention are obtained as the imaging apparatus.

A third embodiment of the present invention is an object determining method, the method including each of the following steps. First, the information processing device detects the face of a person based on the relative value of the statistics in a plurality of characteristic regions produced by the contour or the parts of the face of the person from the image imaged based on arbitrary focal point information. The information processing device then determines the subject to be focused and/or the subject on which to perform exposure control in performing imaging. The third embodiment of the present invention configured as above has effects similar to the first embodiment.

A fourth embodiment of the present invention is an imaging method, the method including each of the following steps. A step in which the information processing device instructs the imaging apparatus to image the image based on the predetermined focal point information or the focal point information acquired by the information acquiring means. A detecting step in which the information processing device detects a face of a person based on a relative value of the statistics in a plurality of characteristic regions produced by the contour or the parts of the face of the person from the image imaged by the imaging apparatus based on the predetermined focal point information. A determining step in which the information processing device determines the subject to be focused and/or the subject on which to perform exposure control when performing imaging based on the detected face. A step in which the information processing device acquires the focal point information for focusing on the determined subject and/or the exposure control information for performing exposure control on the determined subject. A step in which the information processing device instructs the storage device to store the image imaged by the imaging apparatus based on the acquired focal point information and/or the exposure control information.

The fourth embodiment of the present invention may be configured to further include a step in which the information processing device instructs the distance measuring device to distance measure the distance from the imaging apparatus to an arbitrary subject. In this case, when a plurality of faces of the people are detected in the detecting step, the information processing device determines the subject to be focused and/or the subject on which to perform exposure control based on the face with the smallest distance according to the result of distance measurement made by the distance measuring device on each of the plurality of real faces.

In the fourth embodiment of the present invention configured as above, the object determining method according to the third embodiment of the present invention is executed as a step included in the imaging method. Thus, effects similar to the third embodiment of the present invention are obtained in the fourth embodiment of the present invention.

A fifth embodiment of the present invention is an object determining device that includes a detecting means and a determining means. The detecting means detects the subject with the skin color of a person from the image imaged based on the arbitrary focal point information. An example of the subject having the skin color of the person includes face, hand, body etc. of the person. When the detecting means is configured as above, the face of a person cannot be accurately detected but the time required for detection process is reduced. Further, the time and cost required for mounting the detecting means are reduced.

The determining means determines the subject to be focused and/or the subject on which to perform exposure control when performing imaging based on the subject detected by the detecting means.

In the fifth embodiment, the detecting means detects the subject with the skin color of a person. That is, the detecting means of the fifth embodiment of the present invention does not perform detection based on the shape configured by edges and the like in the image, similar to the first embodiment of the present invention.

The shape configured by edges and the like is difficult to recognize in the image that is imaged unclearly. However, the subject having a certain specific color can be detected even from the image that is imaged unclearly. Thus, the detecting means of the fifth embodiment of the present invention detects the subject possibly having the face of a person, that is, the subject having the skin color of a person from the image imaged based on the predetermined focal point information.

The first embodiment of the present invention may be configured to further include a frame acquiring means for acquiring an image of a predetermined frame as an image to be processed from a time-series image including a plurality of frames imaged based on the arbitrary focal point information. When configured in such way, the face detecting means according to the first embodiment has the image of a predetermined frame acquired by the frame acquiring means as the object to be processed.

In the first embodiment of the present invention configured in this way, operations/effects similar to the first embodiment of the present invention are obtained for the time-series image including a plurality of frames.

The determining means according to the first embodiment may be configured to determine the face to be focused and/or the face on which to perform exposure control when performing imaging from a plurality of faces of people based on the position of a plurality of faces of people when a plurality of faces of people are detected by the face detecting means. When configured in this way, operations/effects similar to a sixth embodiment of the present invention to be hereinafter described are obtained.

The determining means according to the first embodiment of the present invention may be configured to determine the face of a person positioned in the middle of a number of detected faces as the reference as the face to be focused and/or the face on which to perform exposure control when performing imaging when a plurality of faces of people are detected by the face detecting means. When configured in this way, operations/effects similar to a seventh embodiment of the present invention to be hereinafter described are obtained.

The determining means according to the first embodiment of the present invention may be configured to include a classifying means for classifying a plurality of detected faces of the people into a plurality of clusters when a plurality of faces of the people are detected by the face detecting means, a temporary determining means for determining the face to be focused and/or the face on which to perform exposure control when performing imaging from the faces of people in the cluster, and an ultimate determining means for ultimately determining the target face from the faces determined by the temporary determining means. When configured in this way, operations/effects similar to an eighth embodiment of the present invention to be hereinafter described are obtained.

The first embodiment of the present invention may be configured to further include a block determining means for determining a selected block to determine the face to be focused and/or the face on which to perform exposure control when performing imaging based on the detection result by the face detecting means. When configured in this way, the determining means is configured so as to determine the target face from the faces in the selected block. When configured in this way, operations/effects similar to a ninth embodiment of the present invention to be hereinafter described are obtained.

The first embodiment of the present invention may be configured to further include a deciding means for deciding the largest face out of the detected faces of the people when a plurality of faces of the people are detected by the face detecting means, and a selecting means for selecting the largest size, and the face having a size of a predetermined range with the size of the largest face as the reference from the detected faces. When configured in this way, the determining means is configured to determine the face to be focused and/or the face on which to perform exposure control when performing imaging from the selected face. When configured in this way, operations/effects similar to a tenth embodiment of the present invention to be hereinafter described are obtained.

The first embodiment of the present invention may be configured to further include a classifying means for classifying a plurality of detected faces of the people into a plurality of clusters based on the respective position when a plurality of faces of the people are detected by the face detecting means, and a cluster determining means for determining the selected cluster for determining the face to be focused and/or the face on which to perform exposure control when performing imaging from a plurality of clusters. When configured in this way, the determining means may be configured to determine the target face from the faces contained in the selected cluster determined by the cluster determining means.

The second embodiment of the present invention may be configured so that the imaging means images a time-series image including a plurality of frames. When configured as above, the second embodiment of the present invention may be configured so as to further include a frame acquiring means for acquiring an image of a predetermined frame from the time-series image including a plurality of frames imaged by the imaging means. Further, the face detecting means may be configured so as to detect the face from the image acquired by the frame acquiring means. Further, the image storing means may be configured so as to store the time-series image imaged by the imaging means.

In the second embodiment of the present invention configured as above, operations and effects similar to the second embodiment of the present invention are obtained for the time-series image containing a plurality of frames.

The second embodiment of the present invention may be configured to further include a displaying means for displaying the face of the person determined by the determining means distinctly from other faces. The displaying means displays a frame around the face of the determined person to display it distinctly from the other frames. The displaying means displays a frame of color and thickness around the face of the determined person different from the frame displayed around the other faces to display it distinctly from the other faces. The displaying means performs an image processing on the face of the determined face and the like different from the other faces to display it distinctly from the other faces. When the displaying means performs such display, the user is able to easily decide based on which face the subject to be focused and the like is determined.

In order to achieve the second aim, the present invention has the following configuration. The sixth embodiment of the present invention is an object determining device and includes a detecting means and determining means. The sixth embodiment of the present invention determines the face to be focused or performed with exposure control according to the position of the detected face. The face determined by the sixth embodiment of the present invention is not limited to the object of focus or exposure control and may be the object of any process. For instance, it may be the object of processes such as color correction (correction of white balance) or edge enhancement.

Specifically, the detecting means detects the face of the person from the input image. The detecting means may be applied with all existing face detecting techniques as long as it is not the technique capable of detecting a plurality of faces of people from the image. For instance, the region including the skin color may be detected as the region of the face. Other examples include the detecting technique using a template of the face or the parts of the face, technique for detecting the region of face based on the gray difference and the like.

The determining means determines the face to be focused and/or the face on which to perform exposure control when performing imaging from the faces of a plurality of people based on the position of the face of a plurality of faces when the faces of a plurality of faces are detected in the detecting means. The determining means does not perform determination by independently considering the position of individual faces but performs determination based on a plurality of faces. That is, the determining means performs determination based on the relative positional relationship of at least a plurality of faces. The determining means may grasp the position of the face as the position of the point contained in the face or may grasp it as the position of the region of face.

It may be configured so that focusing or exposure control are performed on one part of the face (e.g., eye, nose, forehead, mouth, ear) determined by the determining means.

According to the sixth embodiment of the present invention, the face to be focused or performed with exposure control is determined based on the position of a plurality of detected faces. Thus, a predetermined number of faces can be determined even if more faces are detected than the number of faces to be focused or performed with exposure control.

The face to be focused or the face on which to perform exposure control is determined based on the relative position of a plurality of faces without independently considering the position of each detected faces. Thus, the face to be focused or the face on which to perform exposure control is determined according to the condition (e.g., density of the face, position where the face is dense) of a plurality of detected faces. Thus, focusing process or exposure control according to the condition of a plurality of detected faces is performed.

A more specific configuration of the detecting means according to the sixth embodiment of the present invention will now be explained. The detecting means according to the sixth embodiment of the present invention may be configured so as to include a center determining means and a face determining means.

The center determining means determines the center of the position of a plurality of faces of the people based on the position of the faces of a plurality of faces detected in the detecting means. The center indicates a conceptualistic center. For instance, when referring to the center for certain three points, it refers to a plurality of conceptualistic centers such as circumcenter, inner center, orthocenter, barycenter and the like. The center refers to a middle derived according to a certain concept.

Specifically, the center determining means may be configured to derive the center of the polygon that circumscribes the position of a plurality of faces of the people. The polygon may be a polygon having a vertex of a number defined in advance. In this case, the formed polygon does not necessarily need to have the faces of all the people as the vertex.

For instance if the circumscribing polygon is a triangle, the center determining means acquires the center of one of the circumcenter, inner center, orthocenter, and the barycenter of the derived triangle.

If the circumscribing polygon is a square, the center determining means acquires the intersection of the diagonals of the derived square as the center. For instance, if the circumscribing polygon is a square, the center determining means may be configured to divide the square into two triangles, acquire one of the circumcenter, inner center, orthocenter, and the barycenter for each triangle, and acquire the center based on the two acquired points.

If the number of vertexes of the circumscribing polygon is greater than or equal to five, the center determining means may be configured to divide the circumscribing polygon into a plurality of polygons, acquire one of the circumcenter, inner center, orthocenter, and the barycenter for each triangle, configure a new polygon using the acquired points, and acquire the center by repeating the above process for the relevant polygon.

The center determining means may be configured to determine the barycenter of the faces of a plurality of people as the center.

The configuration of the face determining means will now be explained. The face determining means determines the target face based on the position of the center obtained by the center determining means. The face determining means determines the target face according to the number of faces to be focused and/or the faces on which to perform exposure control when performing imaging.

Specifically, the face determining means may be configured to determine the face of a person positioned closest to the center as the target face.

The face determining means may be configured to determine the target faced according to a predetermined reference from the faces positioned within a predetermined distance from the center. A predetermined reference may be based on the size of the face (e.g., reference for determining the face of largest size, reference for determining the face of intermediate size, reference for determining the face of smallest size), may be based on the position of the face in the image (e.g., reference of face closest to the middle of the image), may be based on the orientation of the face (e.g., reference of face facing front), may be based on face-likeness (e.g., reference determining face in which the amount indicating the extent of face likeliness is the largest), may be based on the sex assumed from the face (e.g., reference determining the face assumed as man, reference determining the face assumed as woman), may be based on the age assumed from the face (e.g., face determining the face assumed as youngest age, reference determining the face assumed as middle age), and may be any other references. The predetermined reference may also be that in which a plurality of the above references are appropriately combined.

In the sixth embodiment of the present invention configured as above, the face to be focused or the face on which to perform exposure control is determined based on the center of the position of a plurality of faces as a reference of a relative position of the plurality of faces. For instance, the face positioned substantially at the center of a plurality of faces is determined as the face to be focused or the face on which to perform exposure control. In a situation in which a group is being photographed (situation in which a plurality of faces are packed), the user tends to perform focusing or exposure control (unintentionally) on the face near the middle of the group. Thus, by automatically realizing such manual operation by the user, the trouble of the user can be saved. Therefore, in auto focusing or automatic exposure control, focusing or exposure control is desirably performed generally on the face positioned near the middle of a plurality of faces in the group. Thus, according to the sixth embodiment of the present invention configured as above, the desired control such as the above can be performed automatically and the trouble of the user can be saved.

The determining means in the sixth embodiment of the present invention may be configured to determine the face positioned at the lowest of a plurality of faces of the people as the target face. The lowest face does not necessarily need to be exactly the face positioned lowest and may be the face positioned second from the bottom or the face positioned third from the bottom. When a group picture is imaged in a state the faces of the people are lined longitudinally, faces positioned lower are generally the faces in which the distance to the imaging apparatus is close. Such state occurs, for instance, when the people in the front row duck down and the people in the back row stand to take a picture. The above state occurs, for example, when the group picture is taken using a platform. Thus, the face positioned the lowest becomes the face targeted for focusing or exposure control, and focusing or exposure control is most probably performed on the face closest to the imaging apparatus.

The sixth embodiment of the present invention may be configured to further include a classifying means and a cluster determining means. The classifying means classifies a plurality of detected faces of the people into a plurality of clusters based on the respective position when the faces of a plurality of people are detected by the detecting means. More specifically, the classifying means classifies the plurality of detected faces into a plurality of clusters so that the faces which positions in the image are close are included in the same cluster by using a typical clustering method.

The cluster determining means determines (selects) a cluster (i.e., cluster including a face to be focused or performed with exposure control: referred to as "selected cluster") for determining the face to be focused or performed with exposure control out of a plurality of clusters classified by the classifying means. That is, the face to be focused or performed with exposure control is determined from the faces in the selected cluster ultimately determined by the cluster determining means.

The cluster determining means may determine the selected cluster based on any reference. For instance, the cluster determining means may determine the selected cluster on the number of faces in each cluster, may determine the selected cluster based on the center of the position of a plurality of faces contained in each cluster, or may determine the selected cluster based on the characteristic amount (e.g., size of face, orientation of face, amount acquired based on number of faces and the like, frequency of specific sex assumed from the face, frequency of specific age assumed from the face, or, amount indicating the extent of face likeliness) acquired based on the faces in each cluster.

When the sixth embodiment of the present invention is configured including the classifying means and the cluster determining means as above, the determining means is configured to determine the target face from the faces of people in the selected cluster based on the faces of the people included in the selected cluster.

According to the sixth embodiment of the present invention configured as above, the plurality of faces in the image are divided into a plurality of clusters and the selected cluster for determining the face to be processed is determined from the plurality of clusters. The determining means ultimately determines the face to be processed from the faces in the determined selected cluster.

Therefore, when the cluster of a plurality of faces exist in the image, the face to be processed is not determined based on all the faces in the plurality of clusters and the face to be processed is determined based only on the face in any one of the clusters. Therefore, the control according to only the face contained in the selected cluster determined by the cluster determining means can be performed. For instance, when groups of people exist separated in the image, focusing and/or exposure control specialized to one of the group can be performed instead of the process averaged to the groups. When a group and an isolated person exist in the image, focusing and/or exposure control specialized only to the group or the isolated person can be performed without including the isolated person or the group.

The sixth embodiment of the present invention may be configured to further include a displaying means for displaying the face of the person determined by the determining means distinctly from the other faces. The displaying means displays a frame around the face of the determined person to display it distinctly from the other faces. Further, the displaying means displays a frame around the face of the determined person having a color, thickness, or shape different from the frame displayed around the other faces and displays it distinctly from the other faces. The displaying means performs the image processing on the face of the determined person different from the other faces to display it distinctly from the other faces.

The seventh embodiment of the present invention is an object determining device and includes a detecting means and a determining means. The detecting means has a configuration similar to the sixth embodiment of the present invention.

The determining means according to the seventh embodiment of the present invention determines the face of a person positioned in the middle with a number of detected faces as the reference as the face to be focused or performed with exposure control when faces of a plurality of people are detected by the detecting means. The determining means counts the number of detected faces and determines the face based on the intermediate value of the counted numbers. The determining means, for example, sorts each face based on the x-coordinate thereof and determines the face corresponding to the order of the above intermediate value as the target face. The determining means may determine the target face based on the y-coordinate instead of the x-coordinate. Further, the determining means may be configured to select each face based on the x-coordinate and the y-coordinate, determine, when the same face is selected, such face as the target face, and determine, when different faces are selected, one of the faces as the target face based on a predetermined reference.

According to the seventh embodiment of the present invention, effects similar to the sixth embodiment of the present invention configured to determine the target face based on the center of the positions of a plurality of faces are pseudo-obtained. According to the seventh embodiment of the present invention, the center of the positions of a plurality of faces does not need to be acquired. That is, counting of faces and sorting of data only need to be executed, and geometrical calculation does not need to be executed. Thus, when a general-purpose information processing device is used, the process can be executed at high-speed compared to the sixth embodiment of the present invention.

The seventh embodiment of the present invention may be configured to further include a classifying means and a cluster determining means similar to the sixth embodiment of the present invention. In this case, the determining means in the seventh embodiment of the present invention determines the target face based on the face of a person in the selected cluster.

The eighth embodiment of the present invention is an object determining device including a detecting means, a classifying means, a temporary determining means, and an ultimate determining means. Among them, the determining means and the classifying means have the configuration similar to the sixth embodiment of the present invention.

The temporary determining means of the eighth embodiment of the present invention temporarily determines the faces to be focused or performed with exposure control in each of a plurality of clusters generated by the classifying means. In other words, the temporary determining means determines the faces to be focused and/or the face on which to perform exposure control when performing imaging from the face of a person contained in the relevant cluster for each of a plurality of clusters. The temporary determining means may determine the target face based on any reference. For instance, the temporary determining means may determine the target faces with a process similar to the determining means shown in the sixth embodiment or the seventh embodiment of the present invention. For instance, the temporary determining means may determine the target faces based on a predetermined reference in the face determining means of the sixth embodiment of the present invention.

The ultimate determining means of the eighth embodiment of the present invention ultimately determines the face to be focused or performed with exposure control from the face determined by the temporary determining means. For instance, the ultimate determining means may ultimately determine the target face through a process similar to the determining means shown in the sixth embodiment or the seventh embodiment of the present invention from the faces determined by the temporary determining means in each cluster. Further, the ultimate determining means may ultimately determine the target face based on a predetermined reference in the face detecting means of the sixth embodiment of the present invention from the faces determined by the temporary determining means in each cluster.

According to the eighth embodiment of the present invention, effects similar to the sixth embodiment or the seventh embodiment of the present invention configured so as to further include a classifying means and a cluster determining means are obtained. Moreover, according to the eighth embodiment of the present invention, while maintaining the effect of including the classifying means and the cluster determining means, the face may be determined based on various references when determining the target face.

The ninth embodiment of the present invention is an object determining device and includes a detecting means, a block determining means, and a determining means.

The detecting means according to the ninth embodiment of the present invention detects the face of a person in each of a plurality of blocks divided from the input image. The manner in which the input image is divided into blocks may be defined in advance or may be dynamically determined.

The block determining means determines a block (i.e., block containing the face to be focused or performed with exposure control: referred to as "selected block") for determining the face to be focused and/or the face on which to perform exposure control when performing imaging based on the detection result of the detecting means. For instance, the block may be determined according to the references similar to the cluster determining means in the sixth embodiment of the present invention.

The determining means according to the ninth embodiment of the present invention determines the target face from the faces in the selected block. The target face may be determined based on any reference. For instance, the determining means may determine the target face through a process similar to the determining means shown in the sixth embodiment or the seventh embodiment of the present invention. The determining means may determine the target face based on a predetermined reference in the face detecting means of the sixth embodiment of the present invention.

The tenth embodiment of the present invention is an object determining device including a detecting means, a deciding means, a selecting means, and a determining means. Among them, the determining means has the configuration similar to that of the sixth embodiment of the present invention.

The deciding means decides the largest face of the detected faces of the people when a plurality of faces are detected in the detecting means. The deciding means may decide the size by the number of pixels of the skin color in the detected face of the people. Further, the deciding means may decide the size of the face by the size of the face rectangle used for detecting the face of a person. The deciding means may also be configured to decide the size of the face according to any other references. The largest face does not exactly need to be the largest and may be the second largest or the third largest face.

The selecting means selects the largest face of the detected faces and other faces having a size within a predetermined range from the size of the largest face.

The determining means according to the tenth embodiment of the present invention determines the face to be focused and/or the face on which to perform exposure control when performing imaging from the faces selected by the selecting means. Thus, the determining means according to the tenth embodiment of the preset invention determines the target face from the largest face of the detected faces and the other faces having a size within a predetermined range from the size of the largest face instead of determining the target face based on the position of all the plurality of faces detected by the detecting means. The determining means may determine the target face based on any reference. For instance, the determining means may determine the target face through a process similar to the determining means of the sixth embodiment or the seventh embodiment of the present invention. The determining means may also determine the target face based on a predetermined reference in the face detecting means of the sixth embodiment of the present invention.

According to the tenth embodiment of the present invention, the face to be focused is selected based only on the face of a size having a certain relative extent in the image for focusing. Thus, the person photographed as a background, that is, the face of a person the user did not intend as the subject is prevented from being included as the object of processing. Therefore, when the determining means performs a process similar to the determining means in the sixth embodiment of the present invention, the precision of the process of selecting the cluster including the face to be focused, the process of acquiring the center based on the face in the cluster, or the process of selecting the face to be focused is enhanced.

The eleventh embodiment of the present invention is an object determining device and includes a detecting means, a classifying means, a cluster determining means, and a determining means. Among them, the detecting means, the classifying means and the cluster determining means have a configuration similar to those of the sixth embodiment.

The determining means of the eleventh embodiment of the present invention determines the target face from the faces included in the cluster determined by the cluster determining means. The determining means may detect the target face based on any reference. For instance, the determining means may determine the target face through a process similar to the determining means of the sixth embodiment or the seventh embodiment of the present invention. The determining means may also determine the target face based on a predetermined reference in the face detecting means of the sixth embodiment of the present invention.

According to the eleventh embodiment, effects similar to the eighth embodiment of the present invention are obtained.

The twelfth embodiment of the present invention is an object determining device including a detecting means, a characteristic amount acquiring means, and a determining means. Among them, the detecting means has a configuration similar to that of the sixth embodiment.

The characteristic amount acquiring means acquires the characteristic amount indicating the degree of the face of a person for each of a plurality of faces of the people detected in the detecting means. Here, "extent of face of a person" is provided by a distance from a distinguishing boundary line that divides whether or not a certain image is a face of a person. The extent of face of a person may be indicated using a value acquired in the face detecting process by the detecting means.

The determining means determines the face to be focused and/or the face on which to perform exposure control when performing imaging.

The sixth to the twelfth embodiments of the present invention may be configured to further include a frame acquiring means for acquiring an image of a predetermined frame as an image to be processed from the time-series image including a plurality of input frames. When configured in this way, the detecting means detects the face of a person from the image of a predetermined frame acquired by the frame acquiring means.

In the sixth to the twelfth embodiments of the present invention configured in this way, operations and effects similar to the sixth to the twelfth embodiments of the present invention are obtained for the time-series image including a plurality of frames.

The first to the twelfth embodiments of the present invention may be realized by having the program executed by an information processing device. That is, the present invention can specify the process executed by each means in the first to the twelfth embodiments as the program to be executed by the information processing device or a recording medium that records the relevant program.

According to the present invention, the image in which the subject is focused does not necessarily need to be imaged in the preliminary imaging when detecting the subject. Thus, the primary subject is rapidly detected with only the image acquired based on the predetermined focal point information without performing focal control such as acquiring the image focused on a plurality of focal points in the preliminary imaging.

Further, according to the present invention, when the faces of a plurality of people are detected in the preliminary imaging, to which face focusing or exposure control should be performed is automatically determined based on the position, the size and the like of the plurality of detected faces.

DESCRIPTION OF THE PREFERRED EMBODIMENTS

The imaging apparatus 1 according to a first embodiment will now be explained using the figures. The following explanation of the imaging apparatus 1 is illustrative and the configuration thereof is not limited to the following description.

The imaging apparatus 1 is an information processing device having an imaging function such as a digital still camera, a digital video camera, or a digital still camera and a digital video camera. The imaging apparatus 1 includes, in terms of a hardware, a CPU (central processing unit), a main memory unit (RAM (read only memory), an auxiliary memory unit, and each device (an imaging lens, a mechanics mechanism, a CCD (charge-coupled devices), an operating section, a motor and the like) for operating as the digital still camera or a digital video camera, which are all connected by way of a bus. The auxiliary memory unit is configured using a non-volatile memory unit. The non-volatile memory used herein refers to a so-called ROM (read-only memory: including EPROM (Erasable Programmable Read-Only Memory), EEPROM (Electrically Erasable Programmable Read-Only Memory), mask ROM and the like), FRAM (Ferroelectric RAM), hard disc and the like.

Figure 1:
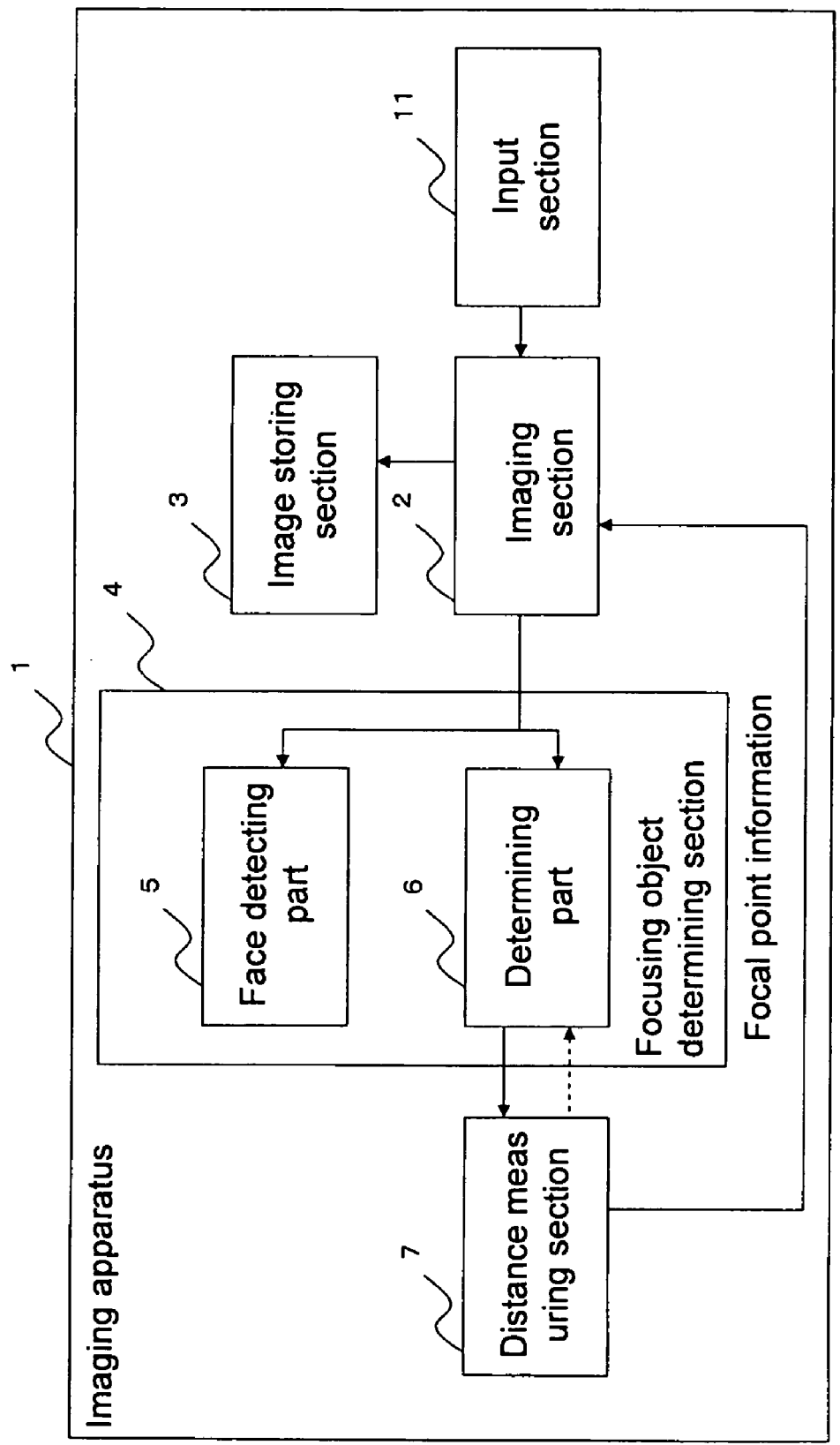
FIG. 1 shows functional blocks of an imaging apparatus.

FIG. 1 shows a view of functional blocks of the imaging apparatus 1. The imaging apparatus 1 functions as a device including an imaging section 2, an image storage section 3, a focusing object determining section 4 serving as an object determining device, a distance measuring section 7, an input section 11 and the like when various programs (OS, application program etc.) stored in the auxiliary memory unit are loaded to the main memory unit and executed by the CPU. The focusing object determining section 4 is realized when the focusing object determining program is executed by the CPU. Further, the focusing object determining section 4 may be realized as a dedicated hardware.

Each functional section in the imaging apparatus 1 will now be described using FIG. 1.

The imaging section 2 is configured as a device equipped with an auto focusing function using an imaging lens, a mechanics mechanism, a CCD, a motor and the like. The imaging lens includes a zoom lens for realizing the zoom function, a focus lens for focusing on an arbitrary subject and the like. The mechanical mechanism includes a mechanical shutter, an aperture, a filter and the like. The motor includes a zoom lens motor, a focus motor, a shutter motor and the like.

The imaging section 2 includes a storing part (not shown) and stores a predetermined focal point information in the storing part. The predetermined focal point information is focal point information defined in advance. When the power of the imaging apparatus 1 is turned on and the focal point information is not input from the distance measuring section 7, the focus lens of the imaging section 2 is controlled so as to be in a state based on the predetermined focal point information. If the focal point information is input from the distance measuring section 7, the focus lens of the imaging section 2 is controlled so as to be in a state based on the input focal point information.

The imaging section 2 performs imaging by converting the image of the subject imaged through the imaging lens including the focus lens controlled as above into an electrical signal by the CCD.

The imaging section 2 may be configured so as to image one or a plurality of still images for each input by the user through the input section 11. The imaging section 2 may be configured so as to image a moving image (time-series image) made up of a plurality of frames in accordance with the input by the user through the input section 11. The imaging section 2 may further be configured, when configured so as to image the moving image, to acquire the image of one frame from a plurality of frames and forwarding the image of the relevant frame to the focusing object determining section 4 as an image to be processed.

The image storage section 3 is configured using a read/write recording medium such as a so-called RAM and the like. The image storage section 3 may be configured using a recording medium that is removable with respect to the imaging apparatus 1. The image storage section 3 stores the data of the image imaged by the imaging section 2.

The focusing object determining section 4 determines the subject to be focused, that is, the subject to be focused from the subjects imaged by the imaging section 2. The focusing object determining section 4 performs a process using the image imaged for focusing by the imaging section 2 based on the predetermined focal point information. The image imaged for focusing is input to the focusing object determining section 4 by the imaging section 2.

The focusing object determining section 4 includes a face detecting part 5 for detecting the face of a person acting as a subject from the input image, and a determining part 6 for determining the subject to focus based on the face detected by the face detecting part 5. Each function part configuring the focusing object determining section 4 will now be explained.

The face detecting part 5 detects the face of a person acting as the subject from the input image based on the statistic (specifically, gray value) in a plurality of partial regions. The processes, of when detecting the face of the person, that are executed by the face detecting part 5 will now be explained in detail.

Figure 2:
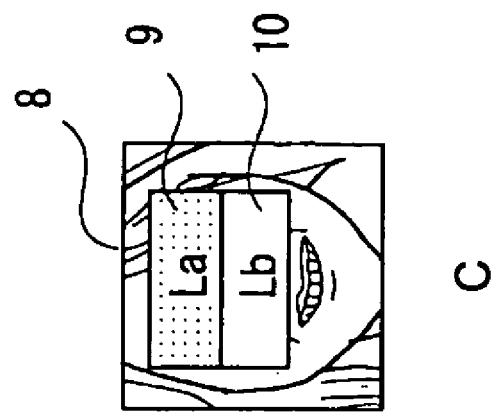
FIG. 2 shows an example of detecting a face with a face determining rectangle.
Figure 2:
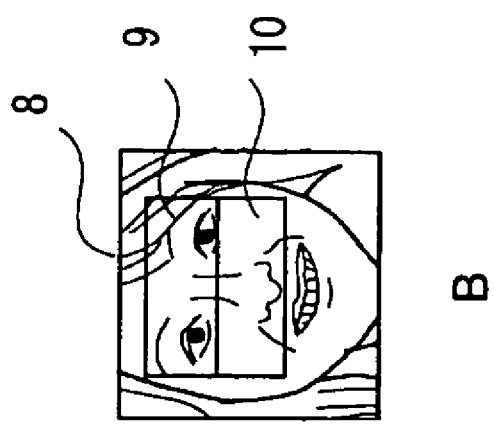
Figure 2:

FIG. 2 shows a view of a method of detecting the face of the person based on the gray value. In this detecting method, a specific rectangle (hereinafter referred to as "face determining rectangle") 8 moves within an image to be processed, and determination is made whether or not the face of the person is in the face determining rectangle 8 (hereinafter referred to as "emphasis region") of each destination. The face of various sizes and angles can be detected by changing the ratio between the size of the face determining rectangle 8 and the size of the image to be processed, and the angle between the face determining rectangle 8 and the image to be processed.

The face determining rectangle 8 includes a plurality of other rectangles (hereinafter referred to as "first rectangle" and "second rectangle") 9 and 10 within the rectangle. The first rectangle 9 and the second rectangle 10 are respectively arranged at a fixed position within the face determining rectangle 8. One or more of the first rectangle 9 and the second rectangle 10 are respectively arranged within one face determining rectangle 8.

In the process of detecting the face, the gray value of the region (hereinafter referred to as "first characteristic region" and "second characteristic region") respectively surrounded by the first rectangle 9 and the second rectangle 10 in each emphasis region is calculated. The gray difference of the first characteristic region and the second characteristic region is, for example, shown by an average value or a total value of the pixel values within each region.

The difference between the gray value La of the first characteristic region and the gray value Lb of the second characteristic region is calculated. Determination is made whether or not the face of the person is in the emphasis region according to whether the difference value is greater than a threshold value ÿ set in advance.

Figure 3:
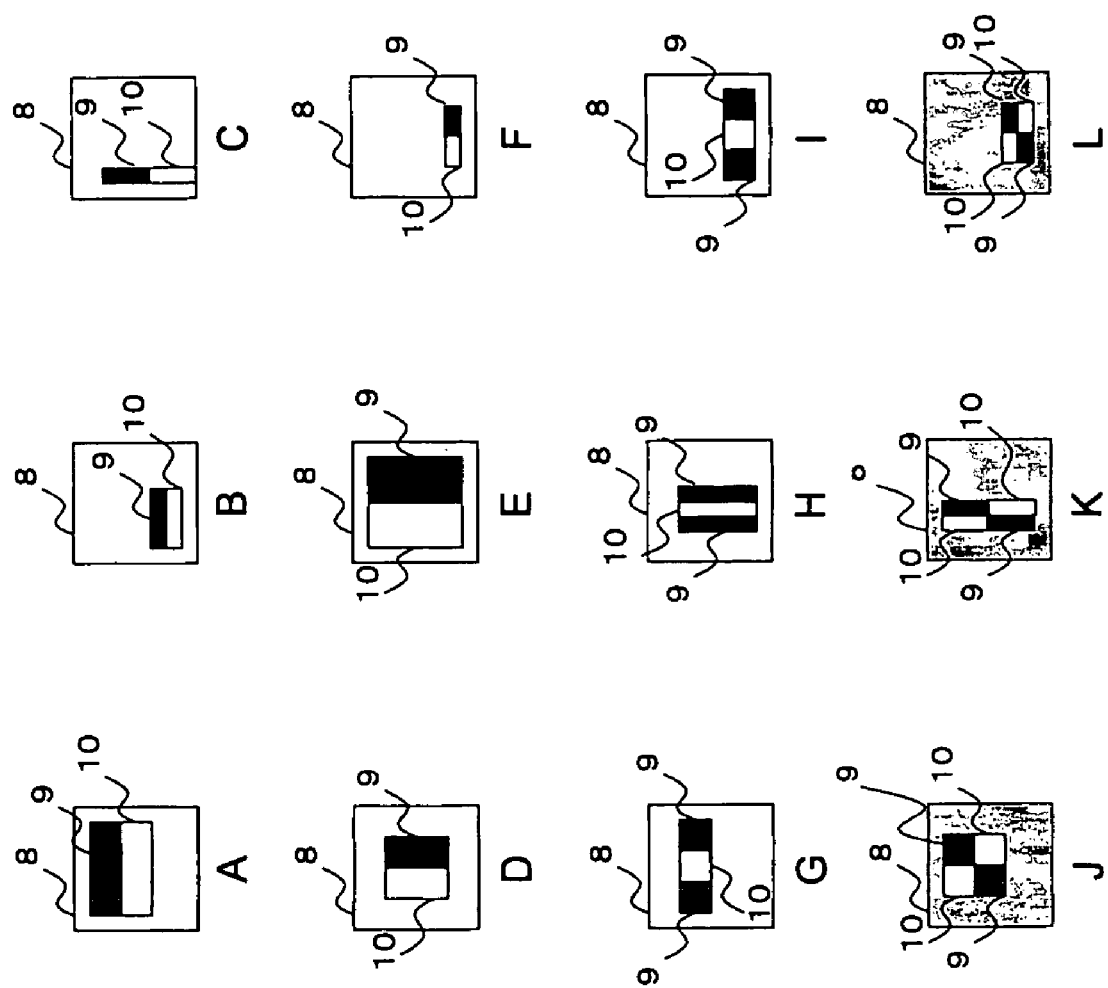
FIG. 3 shows example patterns of the face determining rectangle.
Figure 4:
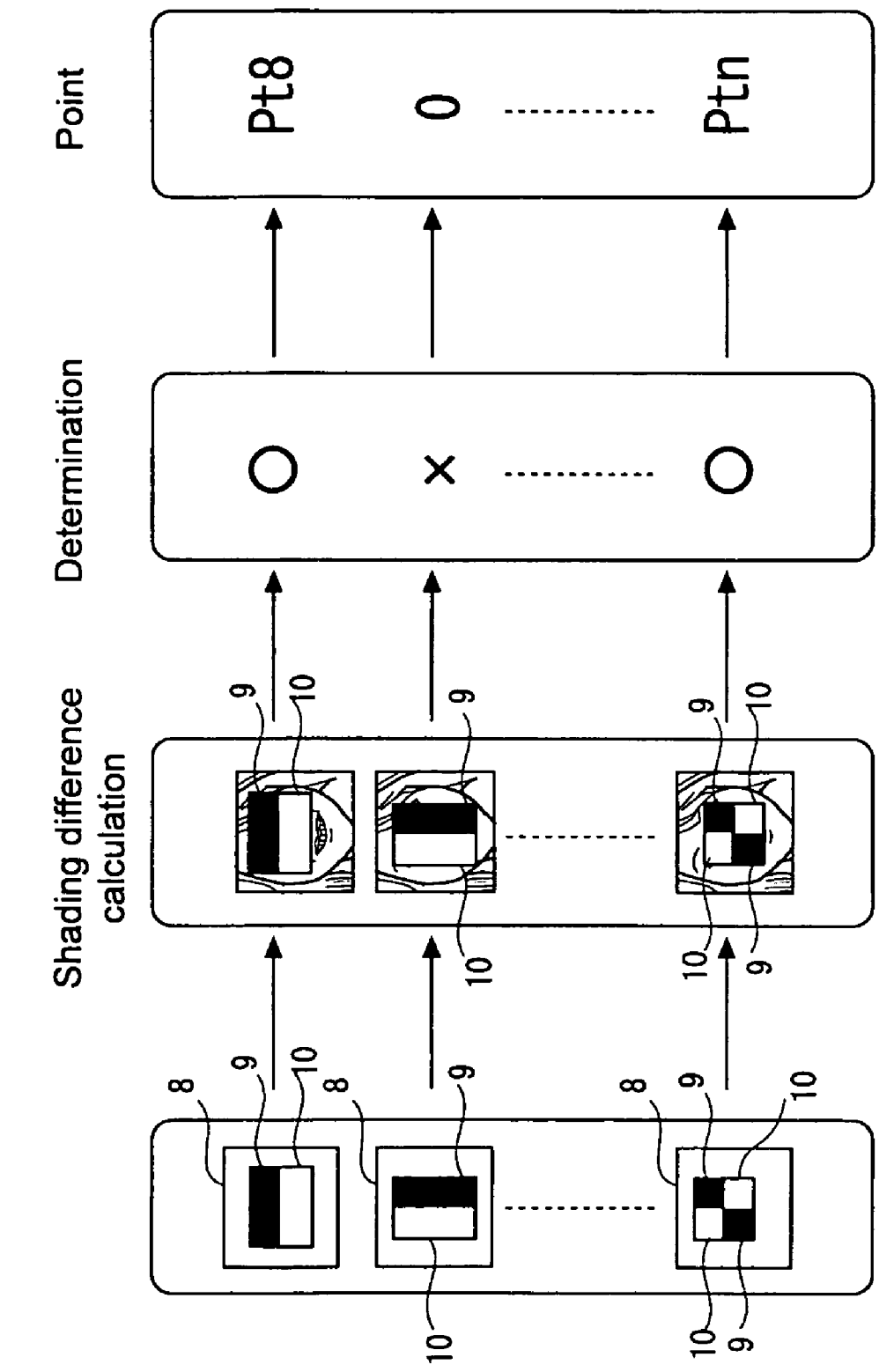
FIG. 4 shows an example of detecting a face with a face determining rectangle.

FIG. 3 shows example patterns of the face determining rectangle 8. FIG. 4 shows a process of face determination using the face determining rectangle 8 of a plurality of patterns. In the actual process, the face determining rectangle 8 of a plurality of patterns is prepared as shown in FIG. 3. The number and position of the first rectangle 9 and the second rectangle 10 differ in each pattern.

The determination through calculation of the gray difference is implemented for the face determining rectangle 8 of each pattern. A point is calculated for each emphasis region based on the respective determination result, and the final determination is made on whether or not the face of the person is included in the emphasis region based on the calculated points. The correspondence of the calculated point and whether the face of the person is included in the emphasis region is obtained in advance by a learning process using, for example, numerous sample images (images including the face of the person and the images not including the face of the person).

When the face detecting part 5 detects the face, that is, makes a final determination that the face of the person is in the emphasis region, the image information relating to the relevant face is output to the determining part 6. Specifically, the face detecting part 5 outputs the position and the size of the emphasis region including the detected face. For instance, the face detecting part 5 outputs the center coordinate and area (number of pixels within the region) of the emphasis region.

Further, the face detecting part 5 may be configured so as to determine and output the orientation of the detected face, as necessary. When the face detecting part 5 determines the orientation of the face, determination is made by using the technique disclosed in non-patent documents 1 and 2, for example. Specifically, the face detecting part 5 implements the detection of the face further using, for example, the face determining rectangle 8 of the pattern for left orientation and the face determining rectangle 8 of the pattern for right orientation. The face detecting part 5 determines that the detected face is left orientated if the face is detected by the face determining rectangle 8 of the pattern for left orientation. Similarly, the face detecting part 5 determines that the detected face is right orientated if the face is detected by the face determining rectangle 8 of the pattern for right orientation. This can also be said for the front view. The determination of the orientation of the face is not limited to the above described technique, and may be performed through application of any technique.

The determining part 6 determines the subject to be focused based on the image information relating to the face input from the face detecting part 5. The determining part 6 mainly performs two processes. The first process is a process of selecting one face from a plurality of faces detected by the face detecting part 5. The second process is a process of determining the subject to be focused based on the face selected by the first process. If only one face is detected in the face detecting part 5, the first process is omitted. If the face is not detected in the face detecting part 5, the first process and the second process are omitted.

The first process will now be explained. In the first process, the determining section 6 selects which image information of the face to use when determining the subject to be focused in the second process. The first process includes three realizing methods of an area comparing method, a point comparing method, and a distance measuring method. Any one of the methods may be used for the determining part 6. Each realizing method will now be explained.

In the area comparing method, the determining part 6 compares the areas of a plurality of faces detected in the face detecting part 5 and selects the face in which the area serving as the image is the largest. In the area comparing method, the determining part 6 selects the face in which the area serving as the image is the largest to detect the face closest to the imaging apparatus 1. That is, in the area comparing method, the determining part 6 compares the distance to the subject by comparing the size of the face image.

In the point comparing method, the determining part 6 derives the point for each of the plurality of faces detected in the face detecting part 5. The determining part 6 obtains the point based on the orientation of the face, the size (area) of the face, the position within the image of the face, the face density around the face and the like. The determining part 6 may obtain points for all of the above four items or may obtain points for a part of the items.

The determining part 6 then selects the face obtained with the highest points. With regards to the orientation of the face, the points are set higher the more the orientation of the face, for example, is oriented towards the front. With regards to the size of the face, the points are set higher the larger the size of the face, for example. With regards to the position within the image of the face, the points are set higher the closer to the middle of the image, for example. With regards to the face density, the points are set higher the higher the face density. What state to make as high points in each item (orientation, size, position, face density) may be designed so as to be changeable by the user or may be designed in any way by the designer.

In the distance measuring method, the determining part 6 acquires the distance measuring result with respect to the actual face of each face detected by the face detecting part 5. The determining part 6 selects the face with the smallest distance from the imaging apparatus 1.

The determining part 6 may be configured so as to obtain the distance measuring result by any of the distance measuring device. For instance, the distance measuring device (not shown) is arranged in the imaging apparatus 1 or the focusing object determining section 4, and the determining part 6 obtains the distance measuring result from the distance measuring device. For instance, if the distance measuring section 7 has a configuration of performing distance measuring to the subject, the distance measuring section 7 may be used as an alternative device of the distance measuring device. In this case, the determining part 6 obtains the distance measuring result by the distance measuring section 7 (refer to broken arrow of FIG. 1). In any event, the determining part 6 provides the coordinate of the emphasis region of the image information input from the face detecting part 5 to the distance measuring device. The distance measuring device measures the distance to the detected face based on the coordinate of the emphasis region.

In the second process, the determining part 6 decides the subject to be focused based on the selected face. An example of such subject includes regions (e.g., eye, nose, mouth, ear, forehead etc.) of the selected face. The position of the region of the selected face may be detected anew by the face detecting part 5 or the position thereof may be obtained from the image information of the selected face. For instance, the determining part 6 recognizes the position relatively distant from the center coordinate of the selected face in a predetermined direction by a predetermined distance as a position of the region of the selected face. The determining part 6 outputs the coordinate (i.e., two-dimensional coordinate) in the image of the subject to be focused to the distance measuring section 7.

The selected face itself may be the subject to be focused. In this case, the determining part 6 outputs the position (i.e., two-dimensional coordinate) of the face contained in the image information of the face selected at the first process to the distance measuring section 7.

The distance measuring section 7 acquires the focal point information for focusing on the subject determined by the determining part 6 of the focusing object determining section 4. The distance measuring section 7 specifies the subject to be focused based on the two-dimensional coordinate input from the determining part 6.

For instance, the distance measuring section 7 is configured so as to acquire the focal point information by distance measuring the distance to the subject by projecting infrared radiation and the like on the subject. In this case, the distance measuring section 7 determines the direction of projecting the infrared radiation and the like based on the two-dimensional coordinate input from the determining part 6.

When acquiring the focal point information, the distance measuring section 7 outputs the acquired focal point information to the imaging section 2.

The input section 11 is configured using a shutter release button and the like. When detecting the input of command from the user, the input section 11 performs notification of the command to each component of the imaging apparatus 1 according to the input command. For instance, when detecting the input of command for auto focus from the user, the input section 11 notifies the command for auto focus to the imaging section 2. Further, when detecting the input of command for imaging from the user, the input section 11 notifies the command for imaging to the imaging section 2.

When the input section 11 is configured using the shutter release button, the command for auto focus is detected by the input section 11 by half-pushing the shutter release button. Further, the command for imaging is detected by the input section 11 by completely pushing the shutter release button.

Figure 5:
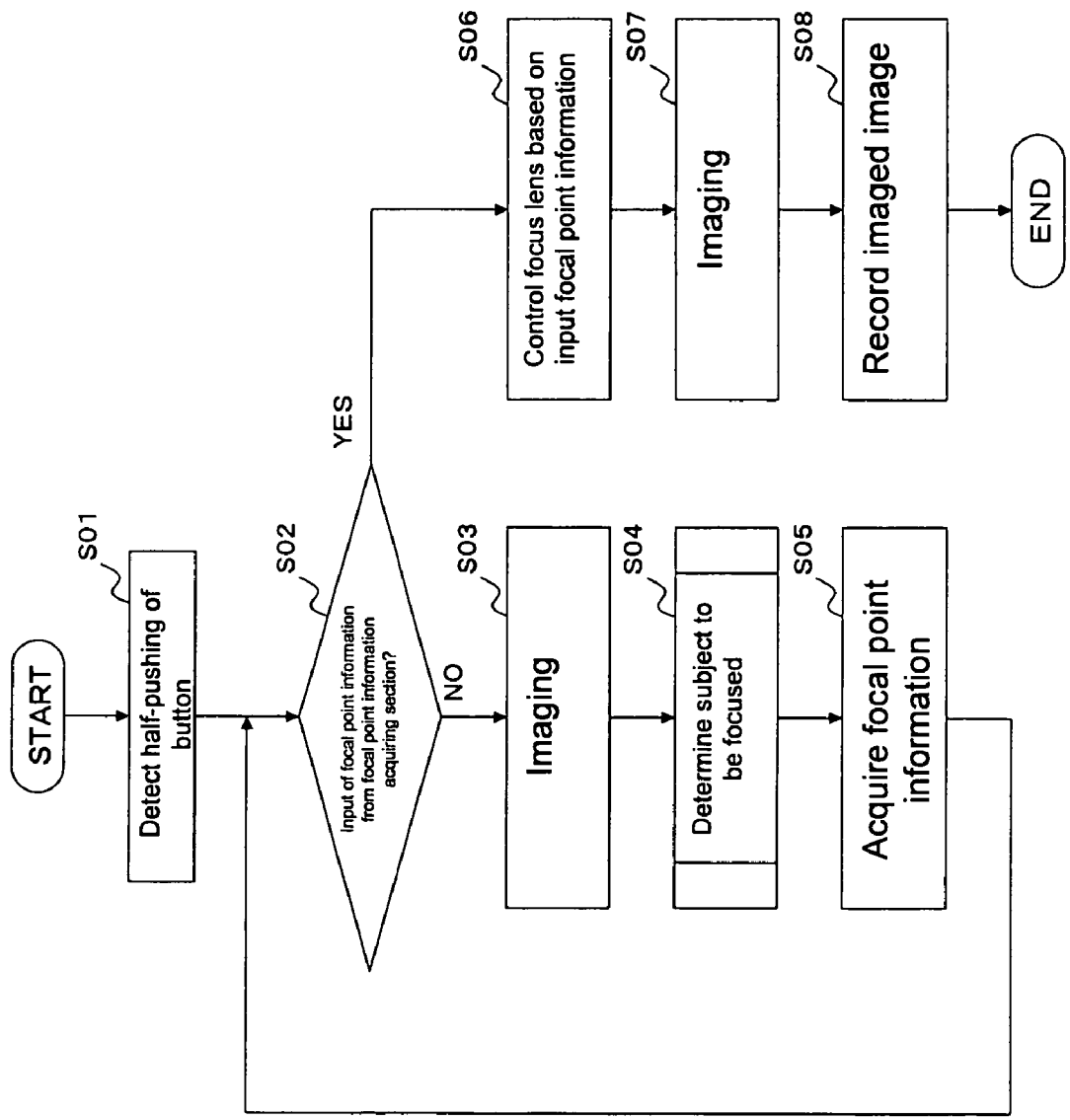
FIG. 5 shows a flowchart showing an operation example of the imaging apparatus.

FIG. 5 shows a flowchart of an operation example of the imaging apparatus 1. The operation example of the imaging apparatus 1 will now be explained using FIG. 5.

When the imaging apparatus 1 is turned on, the imaging section 2 controls the focus lens so as to be in a state based on the a predetermined focal point information.

When detecting that the shutter release button has been half-pushed by the user (S01), the input section 11 notifies the imaging section 2 that the command for auto focus has been input.

The imaging section 2 decides whether or not the focal point information is input from the distance measuring section 7. When the focal point information is not input (S02-NO), the imaging section 2 performs imaging with the focus lens controlled in a state based on the predetermined focal point information (S03). The imaging section 2 outputs the imaged image data to the focusing object determining section 4.

Figure 6:
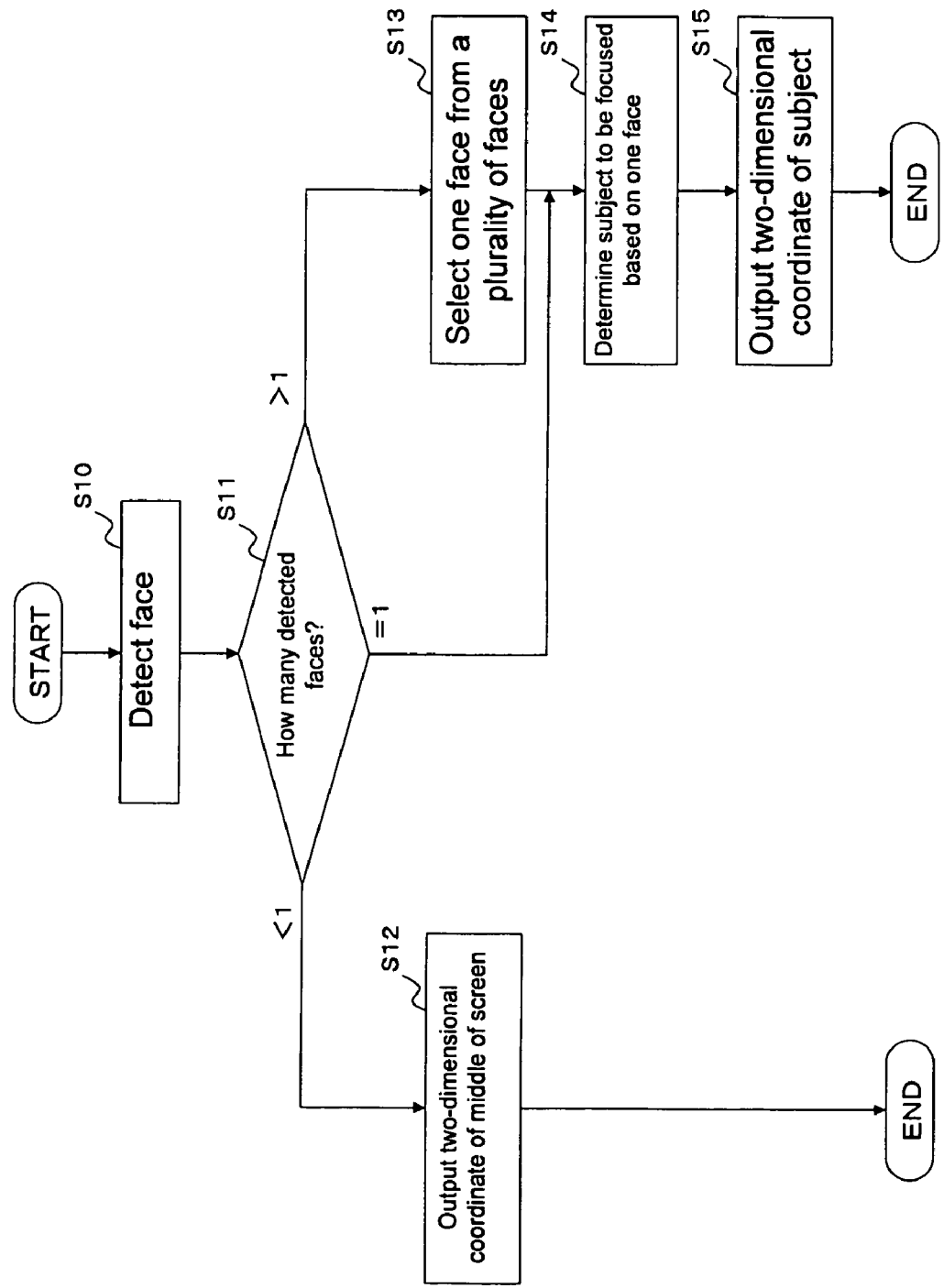
FIG. 6 shows a flowchart showing an operation example of a focusing object determining section.

The focusing object determining section 4 determines the subject to be focused based on the input image data (S04). FIG. 6 shows a flowchart of the operation example of the focusing object determining section 4. The process of S04 will be explained using FIG. 6.

First, the face detecting part 5 detects the face of the person from the input image (S10). The face detecting part 5 outputs the image information of the detected face to the determining part 6.

The determining part 6 investigates the number of faces detected by the face detecting part 5. If the number of faces is less than 1 (S11: <1), that is, if 0, the determining part 6 outputs the two-dimensional coordinate of the middle of the screen to the distance measuring section 7 (S12). If the number of faces is greater than 1 (S11: >1), that is, if a plurality of faces are detected, the determining part 6 executes the first process, and selects one face from the plurality of detected faces (S13).

If the detected face is one (S11: =1), or after the process of S13, the determining part 6 determines the subject to be focused based on the one relevant face (S14). One face means that it is the only detected face when the number of detected faces is one, and it is the selected face when after the process of S13. The determining part 6 then acquires the two-dimensional coordinate of the determined subject and outputs the two-dimensional coordinate to the distance measuring section 7 (S15).

Referring back to FIG. 5, after the process of S04, the distance measuring section 7 acquires the focal point information on the determined subject based on the two-dimensional coordinate output from the determining part 6 of the focusing object determining section 4 (S05). The distance measuring section 7 outputs the acquired focal point information to the imaging section 2. After such process, the processes after S02 are again executed.

In S02, when the focal information is input to the imaging section 2 from the distance measuring section 7 (S02-YES), the imaging section 2 controls the focus lens based on the input focal point information (S06). That is, the imaging section 2 controls the focus lens so that the subject determined by the focusing object determining section 4 is focused.

After controlling the focus lens, the imaging section 2 performs imaging (S07). Through such imaging, the image focused on the subject determined by the focusing object determining section 4 is imaged. The image storage section 3 then stores the data of the image imaged by the imaging section 2 (S08).

Figure 7:
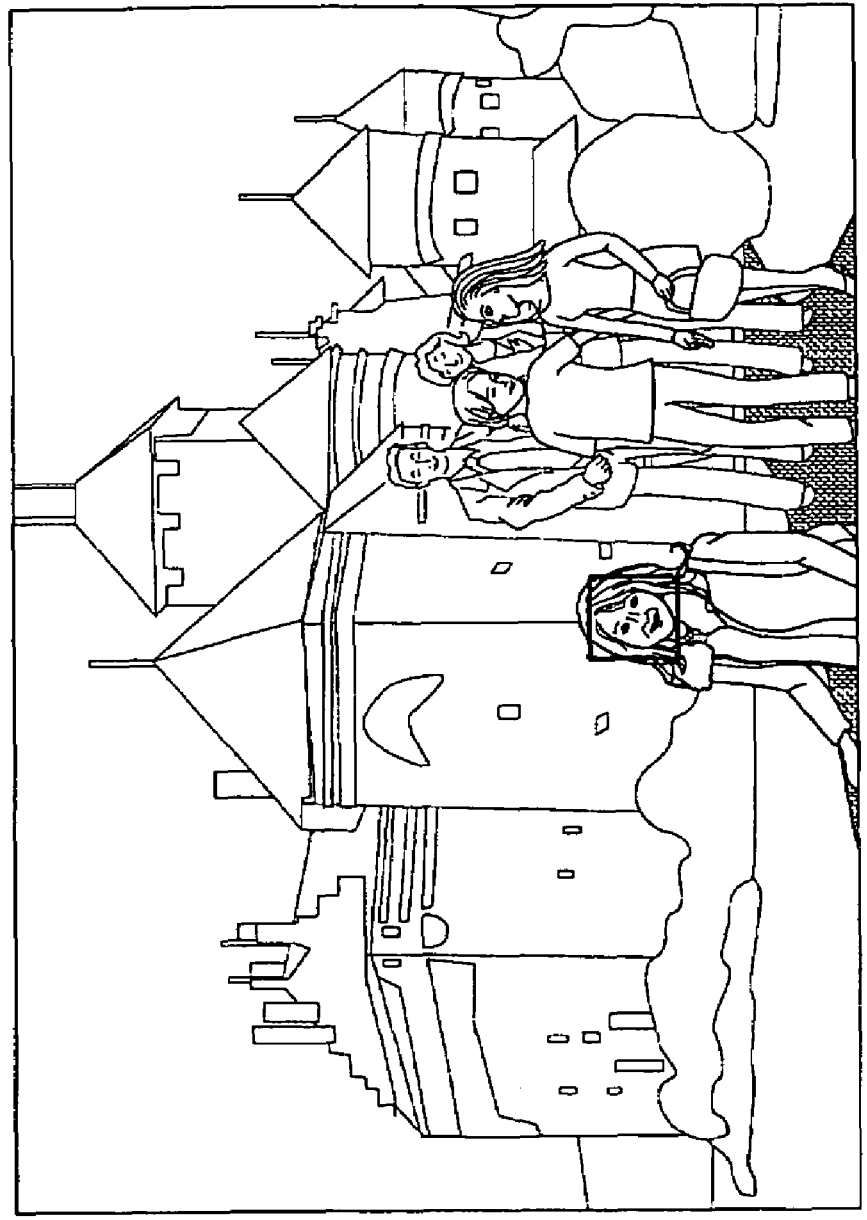
FIG. 7 shows a processing example by the imaging apparatus.

FIG. 7 shows an example of the image imaged by the imaging apparatus 1. In the imaging apparatus 1, the face serving as the primary subject (face surrounded by a rectangle of heavy line) rather than the faces of the people photographed as a background is detected and imaging is performed so as to be focused on the primary subject.

In the imaging apparatus 1, the face detecting part 5 of the focusing object determining section 4 detects the face of the person serving as the subject to be focused. The face detecting part 5 detects the face based on the gray difference between the first characteristic region and the second characteristic region in the emphasis region. When obtaining the gray value of a certain region, a value close to when focused is obtained even if not focused on the subject imaged in the relevant region. Thus, in the imaging apparatus 1, even if the image not focused on the face of the person is imaged, the relevant face can be detected. Therefore, in the imaging apparatus 1, focal point control on the subject does not need to be performed when imaging the image used when detecting the face of the person. Thus, in imaging process, the imaging apparatus 1 is able to implement imaging at high speed without again performing the control of focal point for the focus lens of the imaging section 2 controlled to a predetermined focal point.

The focusing object determining section 4 performs face detection on only the image that is imaged controlled to one image, that is, to a predetermined focal point. Thus, in the imaging apparatus 1, detection of the face does not need to be performed for a plurality of images, and the face can be detected at high speed.

Further, in the imaging apparatus 1, when a plurality of faces are detected, the focusing object determining section 4 selects one of the faces and determines the subject to be focused based on the selected face. Thus, with the imaging apparatus 1, the user does not need to purposely select one face out of a plurality of faces arranged within the frame.

The focusing object determining section 4 may not be included in the imaging apparatus 1 and may be configured independently as an external device of the imaging apparatus 1. The focusing object determining section 4 configured as an external device may be configured to self-contain the distance measuring section (not shown) having the function similar to the distance measuring section 7.

The imaging apparatus 1 acquires the focal point information by measuring the distance to the subject with the distance measuring section 7, but may acquire the focal point information through a method other than distance measurement.

The imaging apparatus 1 may be configured to perform exposure control by determining the subject on which to perform exposure control when imaging is performed based on the detected face. In this case, the determining part 6 determines the subject on which to perform exposure control. Further, in this case, the imaging apparatus 1 further includes a light measuring section for acquiring the exposure control information according to the subject determined by the determining part 6. The light measuring section calculates the amount of exposure (exposure control information) by performing light measurement with the subject determined by the determining part 6 as the exposure area. The light measuring section then forwards the calculated exposure control information to the imaging section 2. The imaging section 2 adjusts the aperture and the like to perform exposure control based on the exposure control information and performs imaging.

The face detecting part 5 may be configured to detect the subject having skin color as the face. With such configuration, the face of the person cannot be accurately detected, but the time required for detection process is reduced, and the time as well as the cost required to mount the face detecting part 5 are reduced.

The imaging section 2 may be realized as a device for manual focusing rather than auto focus function. In this case, it may be configured so that the focus lens is operated by the user, for example, and focusing is informed to the user when in a state adapted to the focal point information input from the distance measuring section 7.

The imaging apparatus 1 may be configured as a silver-lead camera for imaging on a film rather than ultimately performing imaging by the imaging section 2 equipped with the CCD. In this case, the imaging apparatus 1 includes the imaging section 2 equipped with the CCD, and an imaging section serving as the silver-lead camera. In this case, the image storage section 3 is not necessarily required for the imaging apparatus 1. The imaging section 2 performs imaging to input the preliminary imaged image to the focusing object determining section 4. The adjustment of the focus lens based on the focal point information by the distance measuring section 7 is performed in the imaging section serving as the silver-lead camera. It is to be noted that the imaging section 2 and the imaging section serving as the silver-lead camera may be configured to share one part of the configuration such as focus lens.

The imaging apparatus 12 (12a, 12b, 12c, 12d, 12e) equipped with the focusing object determining section 16 (16a, 16b, 16c, 16d, 16e) will now be explained using the figures. In the explanation, the person image refers to an image containing the image of at least partial or entire face of the person. Therefore, the person image may include an image of the entire person or may include an image of only the face of only the upper half of the body of the person. Further, the person image may include an image for a plurality of people. Further, any patterns such as a landscape (background: including objects noticed as subject) or designs other than the person may be included in the background.

The following explanation for the focusing object determining section 16 and the imaging apparatus 12 are illustrative and the configurations thereof are not limited to the following explanation.

An imaging device 12a equipped with a focusing object determining section 16a will first be explained. The imaging apparatus 12a includes, in terms of a hardware, a CPU (central processing unit), a main memory unit (RAM), an auxiliary memory unit, and each device (an imaging lens, a mechanics mechanism, a CCD, an operating section, a motor and the like) for operating as the digital still camera or a digital video camera, which are connected by way of a bus. The auxiliary memory unit is configured using a non-volatile memory unit. The non-volatile memory used herein refers to a so-called ROM, FRAM, hard disc and the like.

Figure 8:
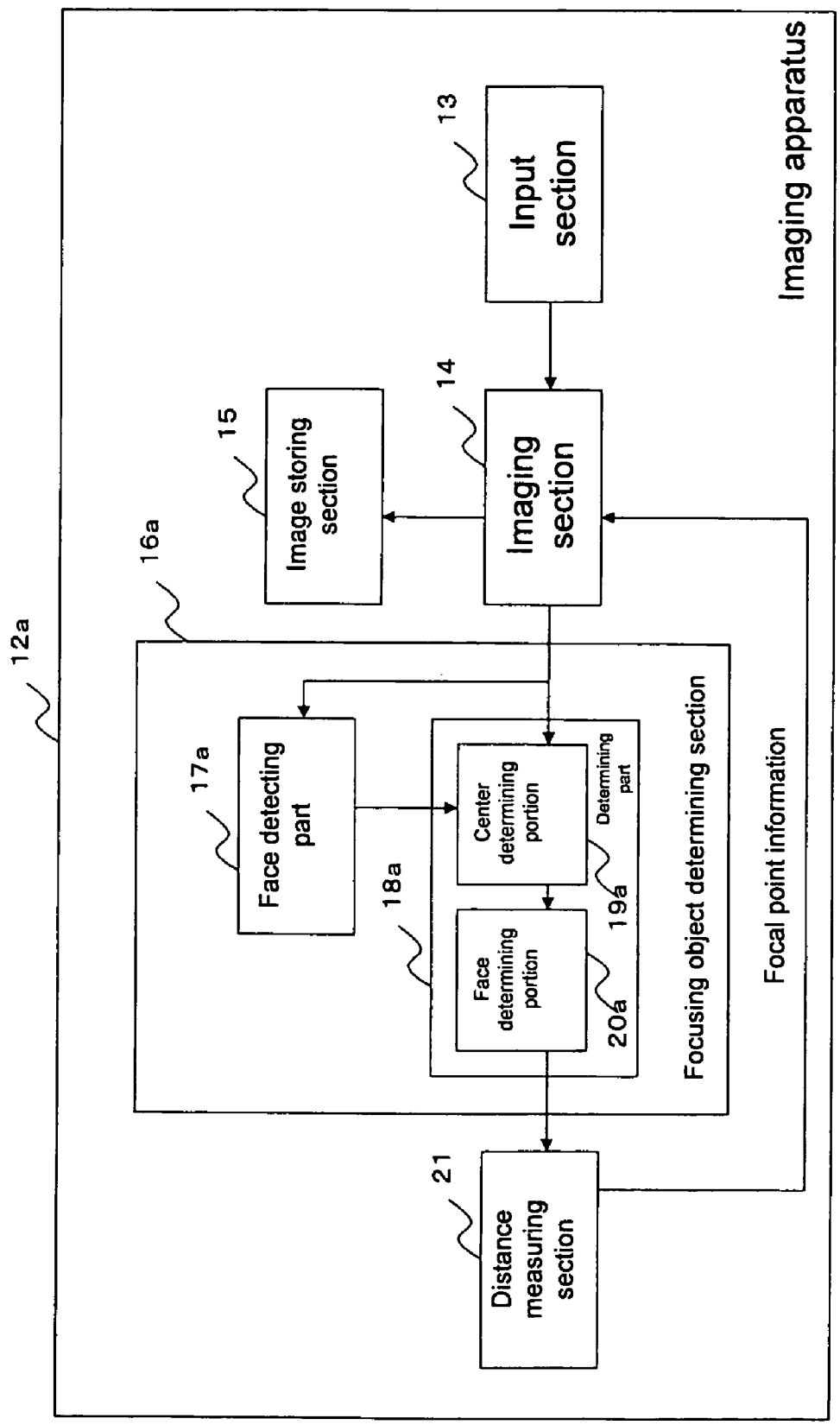
FIG. 8 shows functional blocks of a first embodiment.

FIG. 8 shows functional blocks of the imaging apparatus 12a. The imaging apparatus 12a functions as a device including an input section 13, an imaging section 14, an image storage section 15, a focusing object determining section 16a, a distance measuring section 21, and the like when various programs (OS, application program etc.) stored in the auxiliary memory unit are loaded to a main memory unit and executed by the CPU. The focusing object determining section 16a is realized when the focusing object determining program is executed by the CPU. Further, the focusing object determining section 16a may be realized as a dedicated hardware.

Each functional section in the imaging apparatus 12a will now be described using FIG. 8.

The input section 13 is configured using a shutter release button and the like. When detecting the input of command from the user, the input section 13 performs notification of the command to each component of the imaging apparatus 12a according to the input command. For instance, when detecting the input of command for auto focus from the user, the input section 13 notifies the command for auto focus to the imaging section 14. Further, when detecting the input of command for imaging from the user, the input section 13 notifies the command for imaging to the imaging section 14.

When the input section 13 is configured using the shutter release button, the command for auto focus is detected by the input section 13 by half-pushing the shutter release button. Further, the command for imaging is detected by the input section 13 by completely pushing the shutter release button.

The imaging section 14 is configured as a device equipped with an auto focusing function using an imaging lens, a mechanical mechanism, a CCD, a motor and the like. The imaging lens includes a zoom lens for realizing the zoom function, a focus lens for focusing on an arbitrary subject and the like. The mechanical mechanism includes a mechanical shutter, an aperture, a filter and the like. The motor includes a zoom lens motor, a focus motor, a shutter motor and the like.

The imaging section 14 includes a storing part (not shown) and stores a predetermined focal point information in the storing part. The predetermined focal point information is focal point information defined in advance. When the power of the imaging apparatus 12a is turned on and the focal point information is not input from the distance measuring section 21, the focus lens of the imaging section 14 is controlled so as to be in a state based on the predetermined focal point information. If the focal point information is input from the distance measuring section 21, the focus lens of the imaging section 14 is controlled so as to be in a state based on the input focal point information.

The imaging section 14 performs imaging by converting the image of the subject imaged through the imaging lens including the focus lens controlled as above into an electrical signal by the CCD.

The imaging section 14 may be configured so as to image one or a plurality of still images for each input by the user through the input section 13. The imaging section 14 may be configured so as to image a moving image (time-series image) made up of a plurality of frames in accordance with the input by the user through the input section 13. The imaging section 14 may further be configured, when configured so as to image the moving image, to acquire the image of one frame from a plurality of frames and forwarding the image of the relevant frame to the focusing object determining section 16a as an image to be processed.

The image storage section 15 is configured using a read/write recording medium such as a so-called RAM and the like. The image storage section 15 may be configured using a recording medium that is removable with respect to the imaging apparatus 12a. The image storage section 15 stores the data of the image imaged by the imaging section 14.

The focusing object determining section 16a determines the subject to be focused, that is, the subject to be focused from the subjects imaged by the imaging section 14. The focusing object determining section 16a performs a process using the image imaged for focusing by the imaging section 14. The image imaged for focusing is input to the focusing object determining section 16a by the imaging section 14.

The focusing object determining section 16a includes a face detecting part 17a and a determining part 18a. Each function part configuring the focusing object determining section 16a will now be explained.

The face detecting part 17a obtains the coordinate of the region (hereinafter referred to as "face region") including the face of the person from the image for focusing. The position or size of the face region of the person in the image for focusing is specified by the coordinate of the face rectangle.

The detection of the face region may be achieved by applying any type of existing technique. For instance, the coordinate of the face rectangle may be obtained through template matching using a reference template corresponding to the contour of the entire face. Further, the coordinate of the face rectangle may be obtained through template matching based on the parts (eye, nose, ear etc.) of the face. The vertex of the hair of the head may be detected through a chromakey process, and the coordinate of the face rectangle may be obtained based on the vertex. The coordinate of the face rectangle may also be obtained based on the detection of the color region of the skin.

The determining part 18a determines the subject to be focused based on the face detected by the face detecting part 17a. The determining part 18a forwards the coordinate (e.g., coordinate indicating the middle of the face rectangle) of the face rectangle related to the determined face to the distance measuring section 21. The determining part 18a includes a center determining portion 19a and a face determining portion 20a. Each functional portion of the determining part 18a will now be explained.

The center determining portion 19a derives the center of the positions of a plurality of detected faces when a plurality of faces are detected by the face detecting part 17a. The point at the middle of the face rectangle (hereinafter referred to as "face point") indicates the position of the face. When there are two detected faces, the center determining portion 19a derives the middle point of the two face points. When there are three or more detected faces, the center determining portion 19a derives the center through one of the following methods.

In the circumscribed polygon method, the center determining portion 19a derives the center of a polygon circumscribing a plurality of face points as the center of the positions of a plurality of faces. The number of vertexes of the polygon used may be of any number and is defined in advance. A case of when the number of vertexes is four will be explained in the embodiment.

Figure 9:
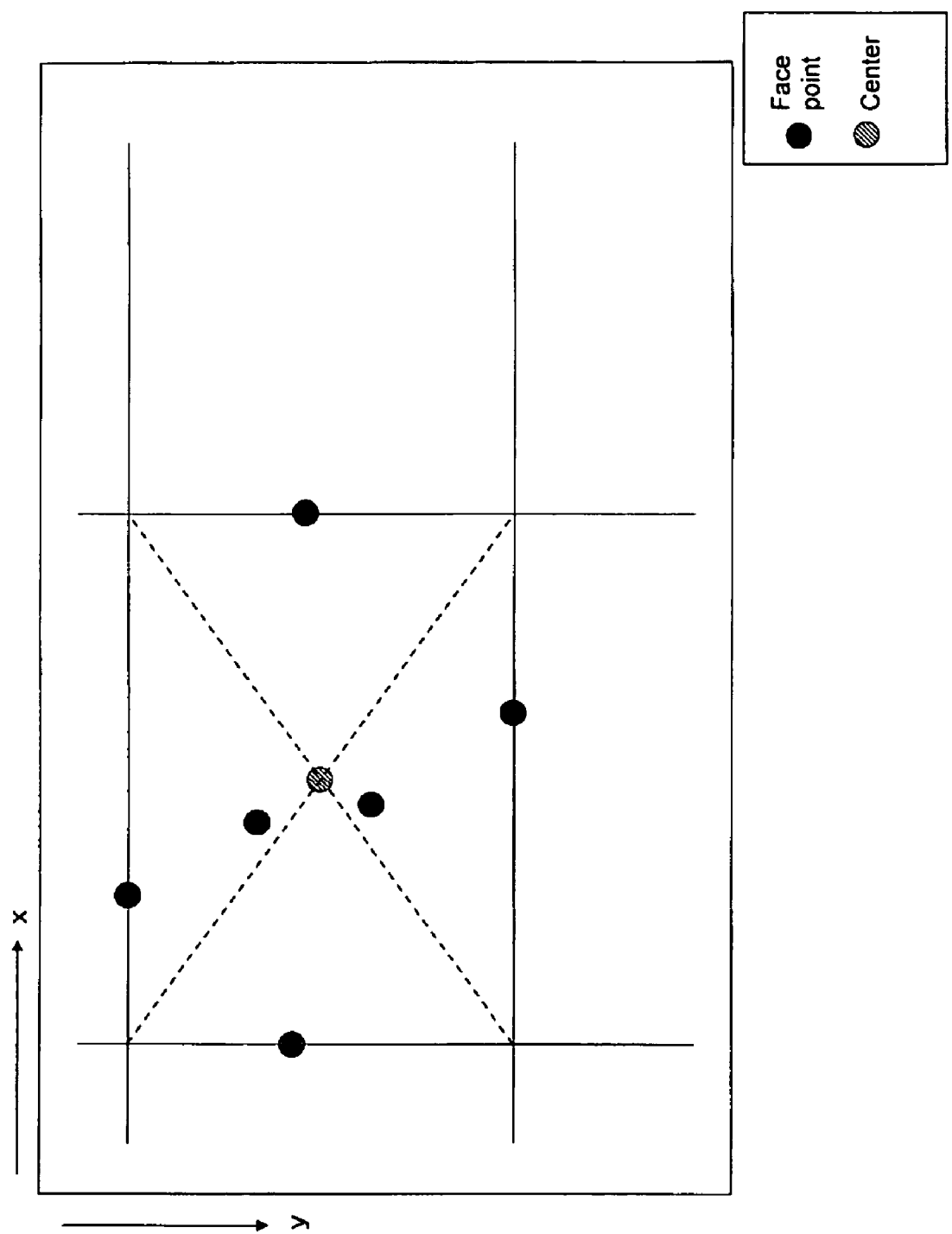
FIG. 9 shows a view explaining a circumscribed polygon method.

FIG. 9 explains the process of the center determining portion 19a acquiring the center based on the circumscribed polygon method. The center determining portion 19a determines a maximum value and a minimum value for the x-coordinate and the y-coordinate in the plurality of face points. The center determining portion 19a produces a rectangle created by a line parallel to the y-axis including the face point taking the maximum value and the minimum value of the x coordinate, and a line parallel to the x-axis including the face point taking the maximum value and the minimum value of the y coordinate (in orthogonal coordinate system, rectangle in which the intersection of each line parallel to the x-axis and y-axis and passing the maximum value and the minimum value of each coordinate component of the face point coordinate is the vertex). The center determining portion 19a acquires the coordinate of the intersection of the diagonal lines of the created rectangle as the coordinate of the center.

Figure 10:
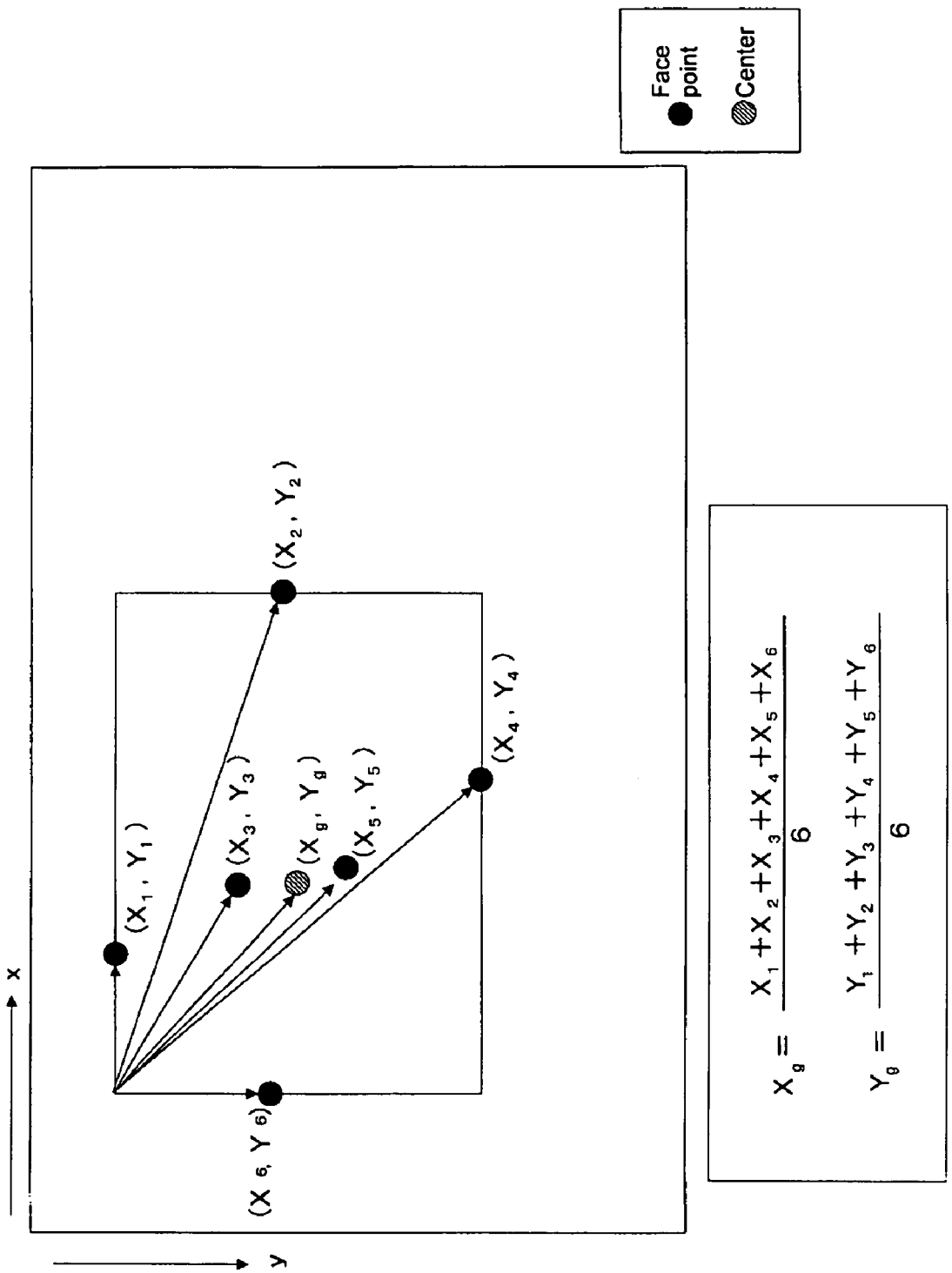
FIG. 10 shows a view explaining a barycenter method.

FIG. 10 explains the process of the center determining portion 19a acquiring the center based on the barycenter method. In the barycenter method, the center determining portion 19a acquires the barycenter of a plurality of face points. Specifically, the center determining portion 19a acquires the position vector of the barycenter by dividing the sum of the position vectors of each face point by the number of face points to acquire the coordinate of the barycenter based on the position vector. The center determining portion 19a acquires the coordinate of the acquired barycenter as the coordinate of the center. FIG. 10 shows the state in which the position vector from a certain reference point (e.g., point indicated by a minimum value of each coordinate component of each face point) is obtained for six face points to obtain the barycenter coordinate (Xg, Yg).

Figure 11:
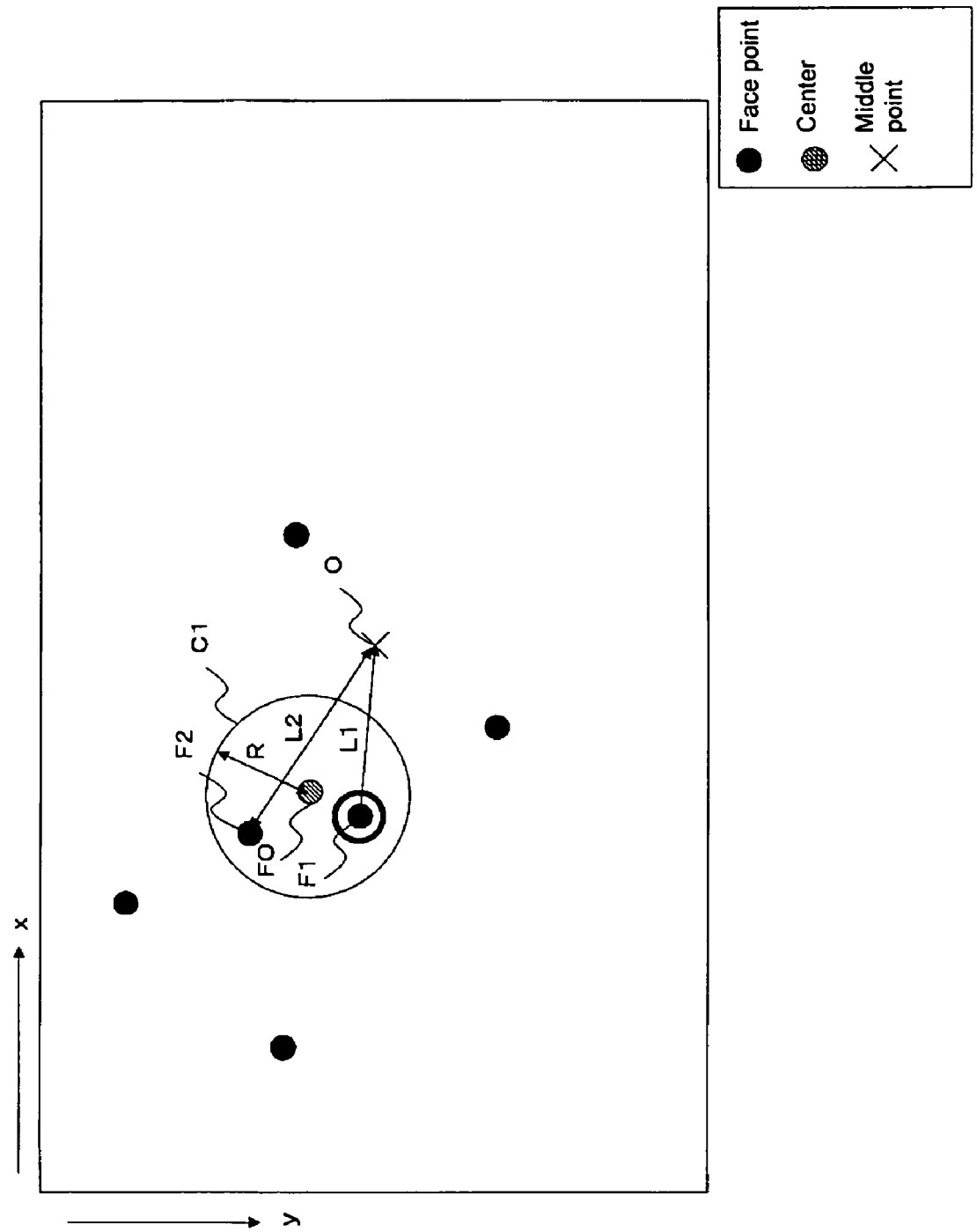
FIG. 11 shows a view explaining the process of a face determining portion.

The face determining portion 20a determines which face the focusing should be performed on based on the coordinate of the center acquired by the center determining portion 19a. FIG. 11 explains the process by the face determining portion 20a. The face determining portion 20a selects the face according to a predetermined reference from the faces positioned within a predetermined distance from the center. The face determining portion 20a may determine the face based on any reference such as the size of the face, the position of the face, the orientation of the face and the like. For instance, the face determining portion 20a selects the face F1 (face point circled with a heavy line) closest to the middle point O (indicated by symbol "X" in FIG. 11) of the image (frame) out of the faces positioned within a predetermined distance from the center acquired by the center determining portion 19a.

In the example shown in FIG. 11, the middle point O and the distances L1 and L2 of the image (frame) are measured for two face points F1 and F2 present within a circle C1 having a predetermined distance R from the center FO of the face point as the radius. Since L1<L2, the face point F1 is determined as the face point to be focused (i.e., face to be focused).

The face determining portion 20a forwards the coordinate of the selected face point to the distance measuring section 21.

The distance measuring section 21 acquires the focal point information for focusing the face determined by the face determining portion 20a of the focusing object determining part 16a. The distance measuring section 21 specifies the subject to be focused based on the two-dimensional coordinate (coordinate of face point) input from the face determining portion 20a. The distance measurement performed by the distance measuring section 21 may be applied with an active method in which the infrared radiation is projected to the real face, or may be applied with a method (e.g., passive method) other than the active method.

The distance measuring section 21 is configured so as to acquire the focal point information by distance measuring the distance to the subject by projecting infrared radiation and the like on the subject. In this case, the distance measuring section 21 determines the direction of projecting the infrared radiation based on the two-dimensional coordinate input from the face determining portion 20a.

When acquiring the focal point information, the distance measuring section 21 outputs the acquired focal point information to the imaging section 14.

Figure 12:
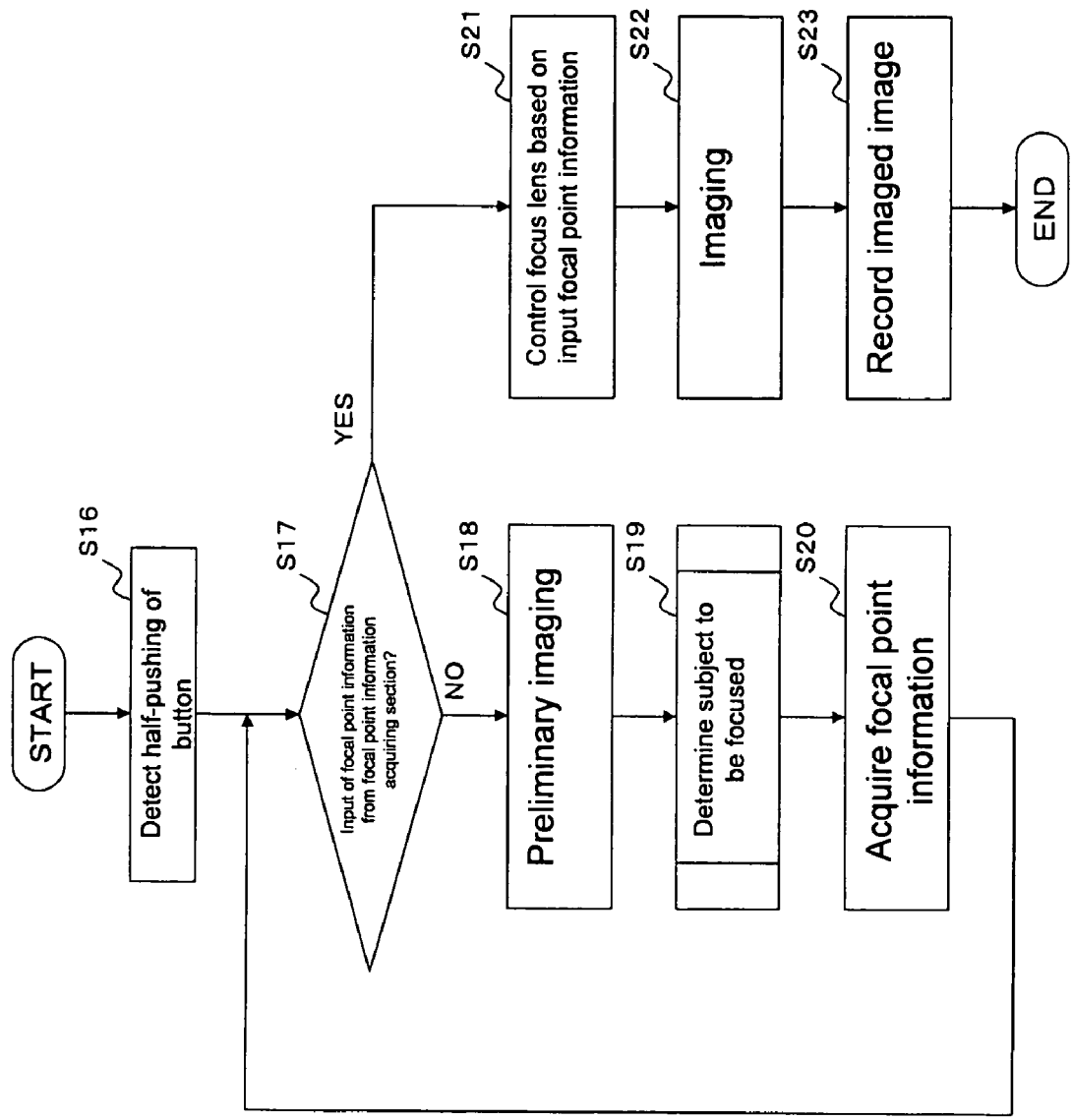
FIG. 12 shows a flowchart showing an operation example of a second embodiment.

FIG. 12 shows a flowchart of an operation example of the imaging apparatus 12a. The operation example of the imaging apparatus 12a will now be explained using FIG. 12.

When the imaging apparatus 12a is turned on, the imaging section 14 controls the focus lens so as to be in a state based on the a predetermined focal point information.

When detecting that the shutter release button has been half-pushed by the user (S16), the input section 13 notifies the imaging section 14 that the command of auto focus has been input.

The imaging section 14 decides whether or not the focal point information is input from the distance measuring section 21. When the focal point information is not input (S17-NO), the imaging section 14 images the image for focusing (S18). The imaging section 14 outputs the imaged image for focusing to the focusing object determining section 16a.

Figure 13:
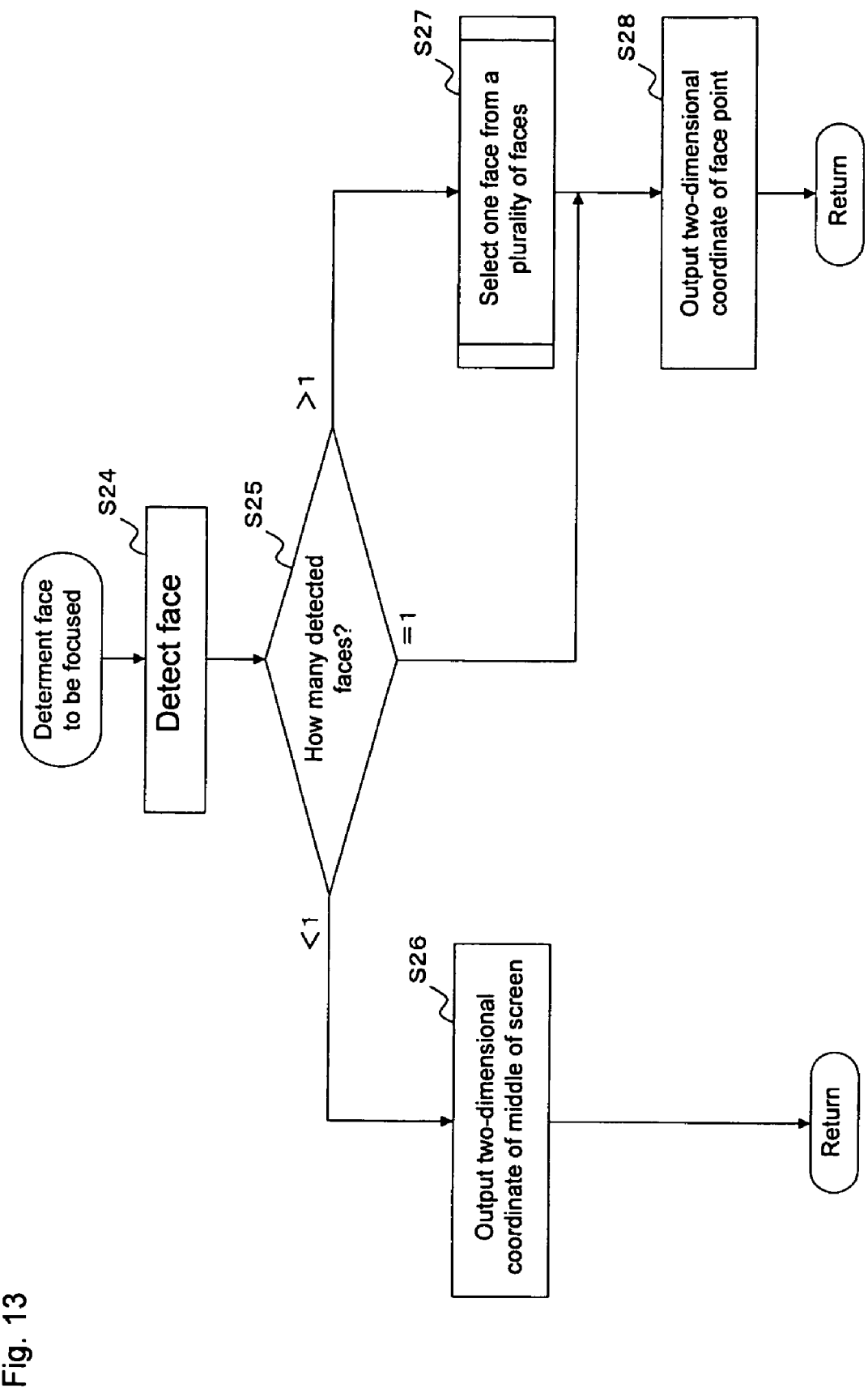
FIG. 13 shows a flowchart showing one part of an operation example of the second embodiment.

The focusing object determining section 16a determines the subject to be focused based on the input image for focusing (S19). FIG. 13 shows a flowchart showing the operation example of the focusing object determining section 16a (example of determining process (S19) of the face to be focused). The process of S19 will be explained using FIG. 13.

First, the face detecting part 17a detects the face of the person from the input image (S24). The face detecting part 17a outputs the image information of the detected face to the center determining portion 19a of the determining part 18a.

The center determining portion 19a investigates the number of faces detected by the face detecting part 17a. If the number of faces is less than 1 (S25: <1), that is, if 0, the center determining portion 19a notifies the face determining portion 20a that there is no face. The face determining portion 20a forwards the two-dimensional coordinate of the middle of the image to the distance measuring section 21 (S26).

Figure 14:
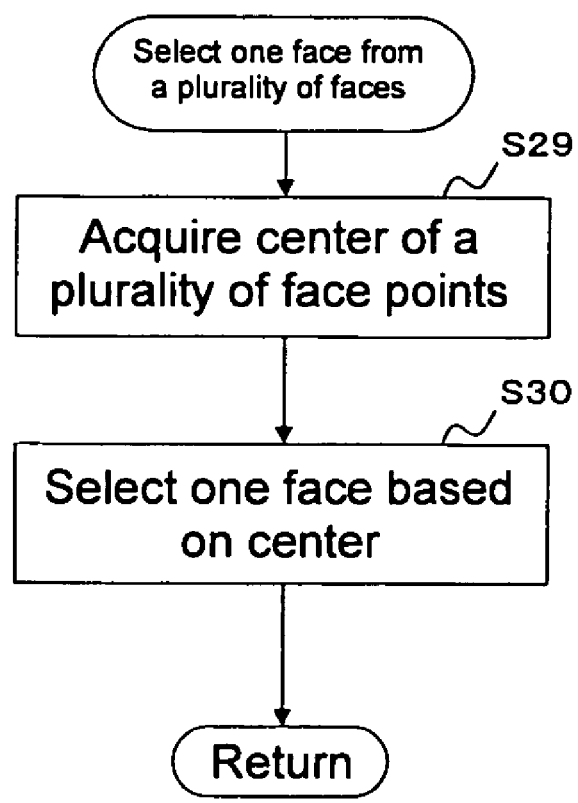
FIG. 14 shows a flowchart showing one part of an operation example of the second embodiment.

If the number of faces is greater than 1 (S25: >1), that is, if a plurality of faces are detected, the determining part 18a executes the process of selecting one face from a plurality of faces (S27). FIG. 14 shows a flowchart showing an example of the process (S27) of selecting one face from a plurality of faces. The process of S27 will be explained using FIG. 14.

The center determining portion 19a acquires the coordinate of the center of the face point of the detected face (S29). The center determining portion 19a forwards the coordinate of the acquired center to the face determining portion 20a. The face determining portion 20a then selects one face through a method explained using FIG. 11 and the like based on the coordinate of the center that has been input (S30).

Referring back to FIG. 13, if the face detected from the image is one (S25: =1), or after the process of S27, the face determining portion 20a forwards the two-dimensional coordinate of the face point of one face to the distance measuring section 21 (S28). One face means that it is the only detected face when the number of detected faces is one, and it is the selected face when after the process of S27.

Referring back to FIG. 12, after the process of S19, the distance measuring section 21 acquires the focal point information based on the two-dimensional coordinate output from the face determining portion 20a of the focusing object determining section 16a (S20). The distance measuring section 21 outputs the acquired focal point information to the imaging section 14. After such process, the processes after S17 are again executed.

In S17, when focal information is input to the imaging section 14 from the distance measuring section 21 (S17-YES), the imaging section 14 controls the focus lens based on the input focal point information (S21). That is, the imaging section 14 controls the focus lens so that the face determined by the focusing object determining section 16a is focused.

After controlling the focus lens, the imaging section 14 performs imaging (S22). Through such imaging, the image focused on the face determined by the focusing object determining section 16a is imaged. The image storage section 15 then stores the data of the image imaged by the imaging section 14 (S23).

According to the imaging apparatus 12a according to a second embodiment of the present invention, the face of the person in the image is detected, and one of the detected faces is automatically determined as an object of focusing. Thus, the user does not need to position the face to be focused at the center of the image (frame). In other words, the user does not need to place the face to be focused at the center of the frame.

According to the imaging apparatus 12a of the second embodiment of the present invention, when a plurality of faces is present in the image, the face to be focused is determined based on the center of the positions of a plurality of faces in the image. Thus, even if a plurality of faces are present in the image, one face to be focused can be determined. Further, focusing can be performed on the face positioned near the middle of a plurality of faces in a group.

The face determining portion 20a may be configured so as to select the face according to a predetermined reference from the faces positioned within a predetermined distance from the center and facing the front. The face determining portion 20a decides whether or not the face is facing front with, for example, the technique disclosed in the following known document. H. Schneiderman, T. Kanade. "A Statistical Method for 3D Object Detection Applied to Faces and Cars." IEEE Conference on Computer Vision and Pattern Recognition, 2000.

A configuration of the center determining portion 19a that handles the position of the face as a point is explained in the above description, but the center determining portion 19a may handle the position of the face as a region.

The face determined by the face determining portion 20a may be displayed with a frame around the relevant face by way of the displaying section (not shown). With such configuration, the user is able to know which face is determined as the object of focusing. Further, it may be designed so that if the user is not satisfied with focusing on the face that is displayed, the user may input a command through the input section 13 to manually operate to focus on a different face.

The face determining portion 20a may be configured so as to select the face according to a predetermined reference from the faces positioned within a predetermined distance from the center and having a size greater than or equal to the predetermined reference.

The imaging apparatus 12a may be configured to implement exposure control based on the face determined by the determining part 18a. This is the same for the second to the sixth embodiments to be hereinafter described.

The determining part 18a sorts each face detected by the face detecting part 17a based on the x coordinate or the y coordinate, and determines the face corresponding to the intermediate value of the number of detected faces as the target face.

Further, the determining part 18a may be configured to determine the face according to a predetermined reference from the faces detected by the face detecting part 17a. The predetermined reference may be based on the size of the face, for example (e.g., reference determining the face of largest size, reference determining the face of intermediate size, reference determining the face of smallest size); may be based on a position of the face in the image (e.g., reference of face closest to the middle of the image); may be based on the orientation of the face (e.g., reference of face facing the front); may be based on face-likeness (e.g., reference determining a face in which the amount indicating the extent of face likeliness is the largest); may be based on the sex assumed from the face (e.g., reference determining the face assumed as man, reference determining the face assumed as woman); may be based on the age assumed from the face (e.g., reference determining the face assumed as youngest age, reference determining the face assumed as middle age); and may be any other references. The predetermined reference may also be that in which a plurality of the above references are appropriately combined.

In the above explanation, the imaging section 14 is assumed to be configured to perform focusing on one subject. Thus, the focusing object determining section 16a outputs the coordinate of one face to the distance measuring section 21. However, if the imaging section 14 is configured to perform focusing on a plurality of subjects, the focusing object determining section 16a may be configured to output the coordinate of a plurality of faces to the distance measuring section 21 according to the number. The device disclosed in Japanese Laid-Open Patent Publication No. 11-295826 is an example of the imaging section 14. In this case, the face determining portion 20a of the determining part 8a gives priority to the face according to the predetermined reference and selects a predetermined number of faces based on the priority. For instance, the face determining portion 20a may be configured to select a predetermined number of faces in the order closest to the center determined by the center determining portion 19a. If the number of selected faces does not meet the predetermined number, the coordinate to be output to the distance measuring section 21 may be acquired through any other methods.

An imaging apparatus 12b equipped with a focusing object determining section 16b will now be explained. The points different from the imaging apparatus 12a and the focusing object determining section 16a of the second embodiment will be explained for the imaging apparatus 12b and the focusing object determining section 16b.

Figure 15:
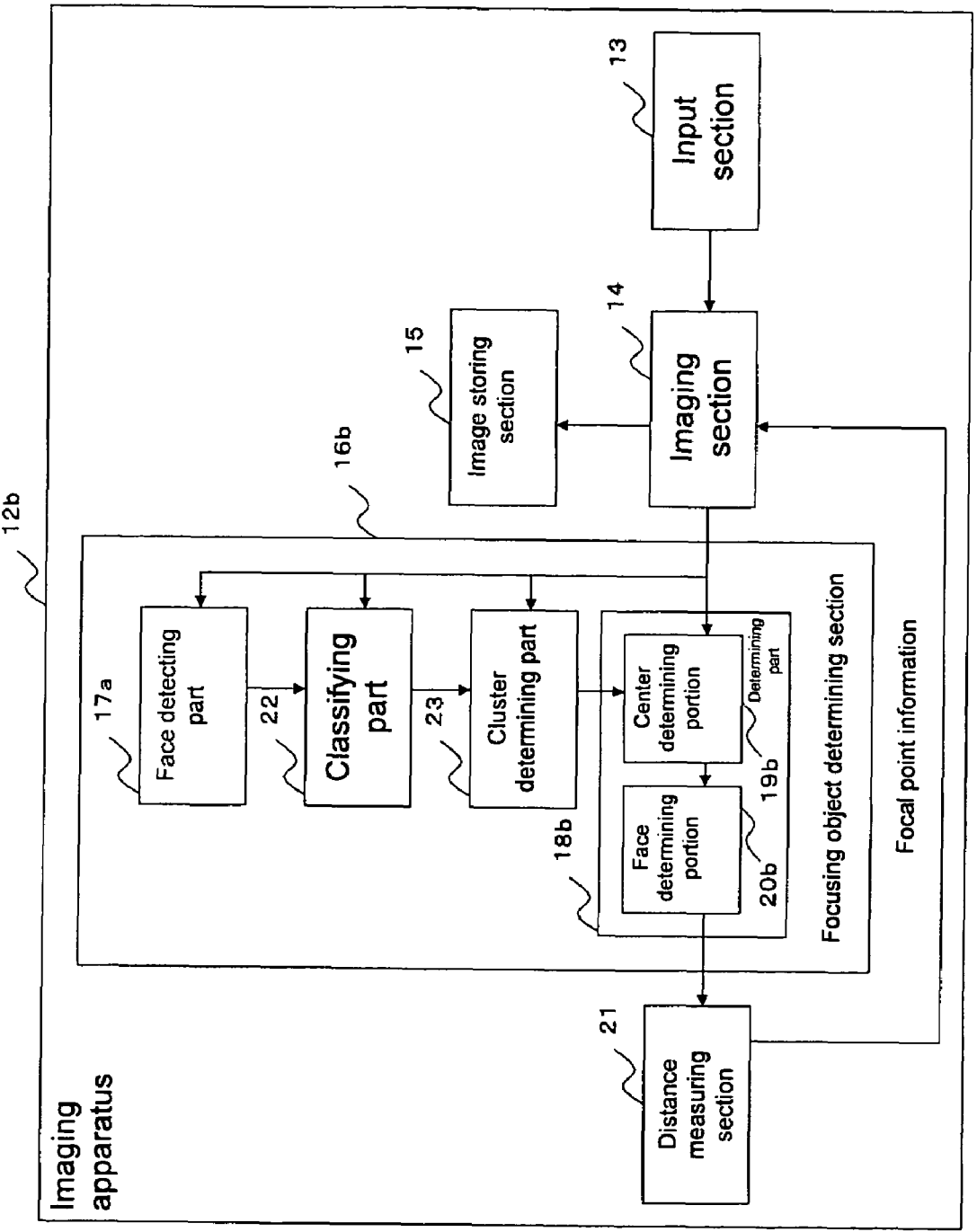
FIG. 15 shows functional blocks of a third embodiment.

FIG. 15 shows a view of functional blocks of the imaging apparatus 12b. The imaging apparatus 12b differs from the imaging apparatus 12a according to the second embodiment in that the focusing object determining section 16b is arranged in place of the focusing object determining section 16a. Therefore, the explanation of the input section 13, the imaging section 14, the image storage section 15, and the distance measuring section 21 of the imaging apparatus 12b will be omitted.

The focusing object determining section 16b includes the face detecting part 17a, a classifying part 22, a cluster determining part 23, and a determining part 18b. The function of each part configuring the focusing object determining section 16b will now be explained. The face detecting part 17a of the focusing object determining section 16b has the same configuration as the face detecting part 17a of the focusing object determining section 16a of the second embodiment, and thus the explanation thereof is omitted.

The classifying part 22 clusters the face points of the face detected in the face detecting part 17a into a plurality of clusters. Any method such as a nearest neighbor method and the like may be used for clustering. The classifying part 22 performs clustering based on the position of each face point. As a result of clustering by the classifying part 22, each face point is classified so that the face points in which the positions in the image are close are in the same cluster.

Figure 16:
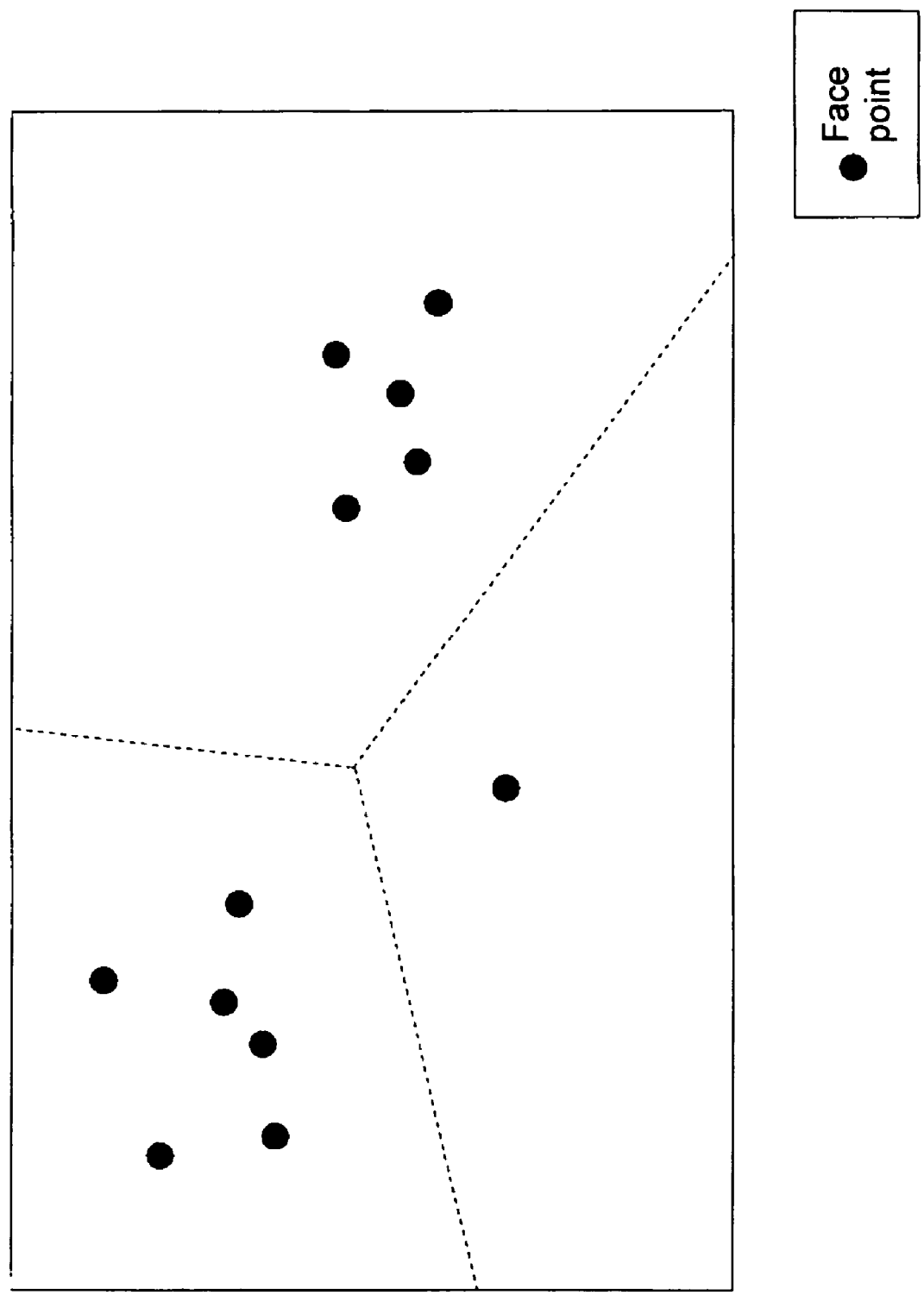
FIG. 16 shows a processing example of a classifying section.

FIG. 16 shows a processing example of the classifying part 22. When a group of a plurality of face points is present as in FIG. 16, the face point is classified as one cluster for each group.

The cluster determining part 23 determines the cluster for determining the face to be focused of a plurality of clusters classified in the classifying part 22 (i.e., cluster including the face to be focused: hereinafter referred to as "selected cluster"). That is, the coordinate of the face point output to the distance measuring section 21 becomes the coordinate of the face point of the face in the selected clustered determined by the cluster determining part 23.

The cluster determining part 23 may determine the selected cluster based on any reference such as the number of faces included in each cluster, the characteristic amount related to the face contained in each cluster and the like. For instance, the cluster determining part 23 determines the cluster with the most faces as the selected cluster. Further, the cluster determining part 23 determines, for example, the cluster in which the sum of the characteristic amount related to the face in each cluster is the largest as the selected cluster. The characteristic amount related to the face may be acquired based on the size of the face, the orientation of the face, the number of faces and the like. Further, the characteristic amount related to the face may be a value indicating the facial extent of a person. The facial extent of the person is provided by the distance from the distinguishing boundary line that divides whether or not a certain image is a face of a person. The facial extent of the person may be indicated by using the value acquired in the face detecting process in the face detecting part 17a.

The example of the process of the cluster determining part 23 will now be explained using FIG. 16. The cluster on the upper left is selected as the selected cluster by the cluster determining part 23 according to a predetermined reference (that having the most number of face points in the cluster) from a plurality of clusters (three clusters in FIG. 16) generated by the process of the classifying part 22.

The determining part 18b differs from the determining part 18a in that the process is performed based on the face included in the selected cluster determined by the cluster determining part 23 rather than the face included in the entire image imaged by the imaging section 14 (the selected cluster is the parent cluster for determination of the face). The determining part 18b performs processes similar to the determining part 18a other than the above points.

Figure 17:
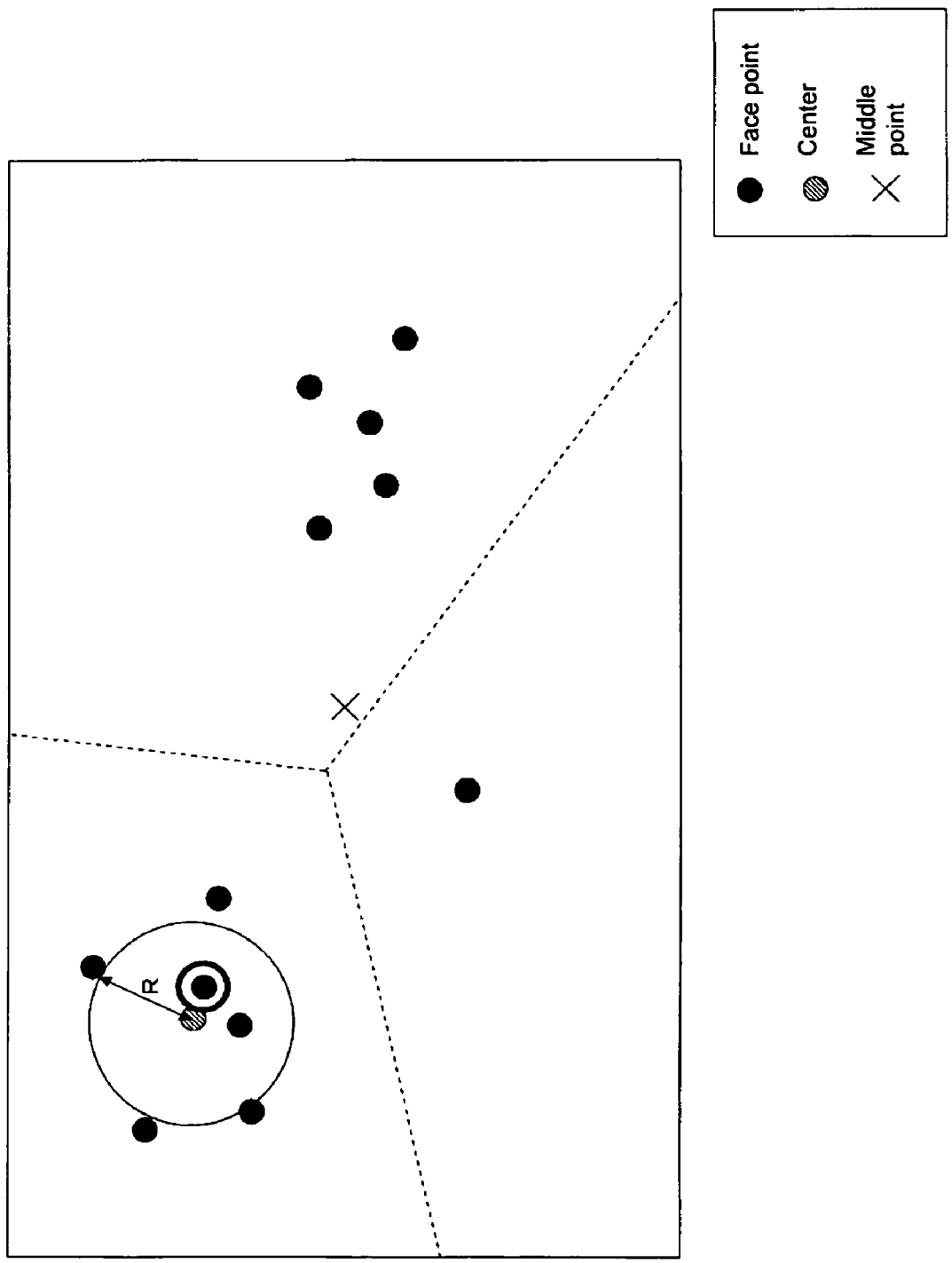
FIG. 17 shows a processing example of a determining part according to the third embodiment.

FIG. 17 shows a processing example of the determining part 18b. The center of the face point is acquired by the center determining portion 19b of the determining part 18b in the selected cluster that is selected by the cluster determining part 23. One face point (face point circled with a heavy line) is selected according to the predetermined reference (closest to the middle point of the image (frame)) with the face determining portion 20b based on the acquired center.

The operation example of the imaging apparatus according to the third embodiment will now be explained. The operation of the imaging apparatus 12b is the same as the operation of the imaging apparatus 12a according to the second embodiment except for the content of the process of S27. Thus, only the content of the process of S27 will be explained with regards to the operation example of the imaging apparatus 12b.

Figure 18:
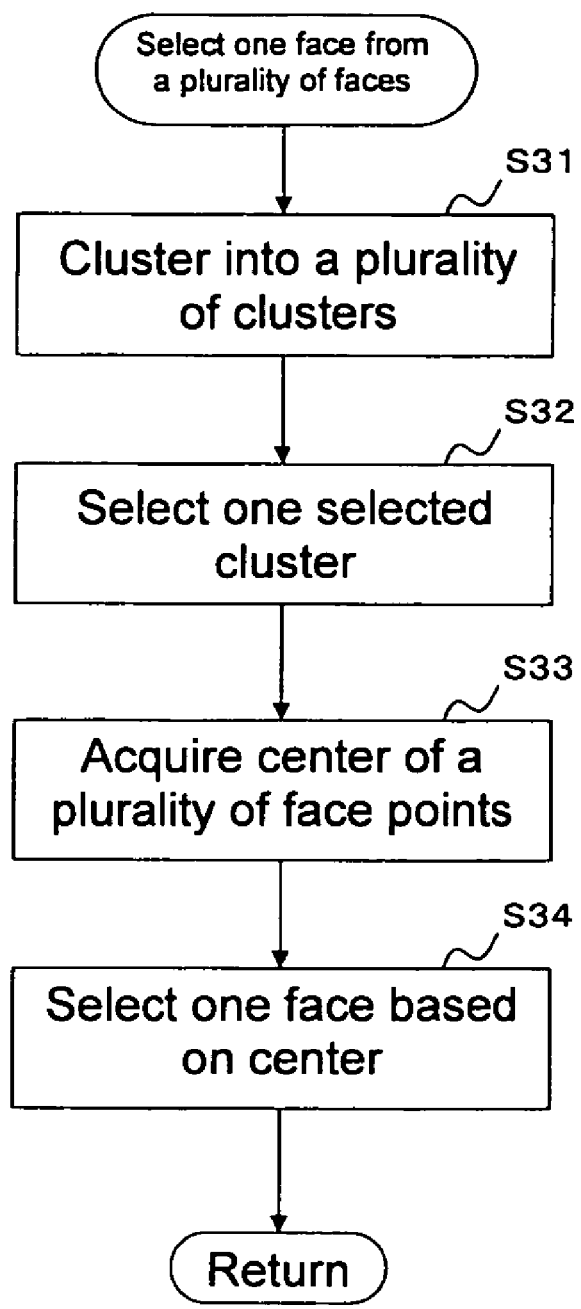
FIG. 18 shows a flowchart showing one part of an operation example of the third embodiment.

FIG. 18 shows a flowchart showing one part of the process of the focusing object determining section 16b according to the third embodiment, that is, the content of the process of S27 in FIG. 13. In the third embodiment, the process shown in FIG. 18 is performed in S27 in place of the process of FIG. 14 explained in the second embodiment.

When the process of S27 is started, the classifying part 22 clusters a plurality of face points detected by the face detecting part 17a into a plurality of clusters (S31). The cluster determining part 23 then selects one selected cluster from a plurality of clusters generated by the classifying part 22 (S32).

The center determining portion 19b acquires the center of the plurality of points contained in the selected cluster based on the face included in the selected cluster selected in S32 (S33). The face determining portion 20b selects one face as the face to be focused based on the center acquired in S33 (S34).

According to the imaging apparatus 12b according to the third embodiment, the face to be focused can be determined based only on the person included in one cluster if a plurality of groups exists in the image. When the user is imaging a certain group, the people in the group tend to be grouped at one location. Even if the person not belonging to the relevant group (single person, scattering of single person, other group of people) is present in the frame, the subject to be focused is desirably selected from the people belonging to the group the user intends to image. According to the imaging apparatus 12b of the third embodiment, the user is able to realize such desire. That is, in the third embodiment, the group (cluster) having the most number of people that can be fitted within a frame is selected as the group (selected cluster) to be imaged, and focusing is achieved with anyone belonging to the relevant group as the reference. As hereinafter explained in the variant section, if the selected cluster selected by the cluster determining part 23 is not the cluster desired by the user, the user may select an arbitrary cluster as the selected cluster by hand.

Figure 19:
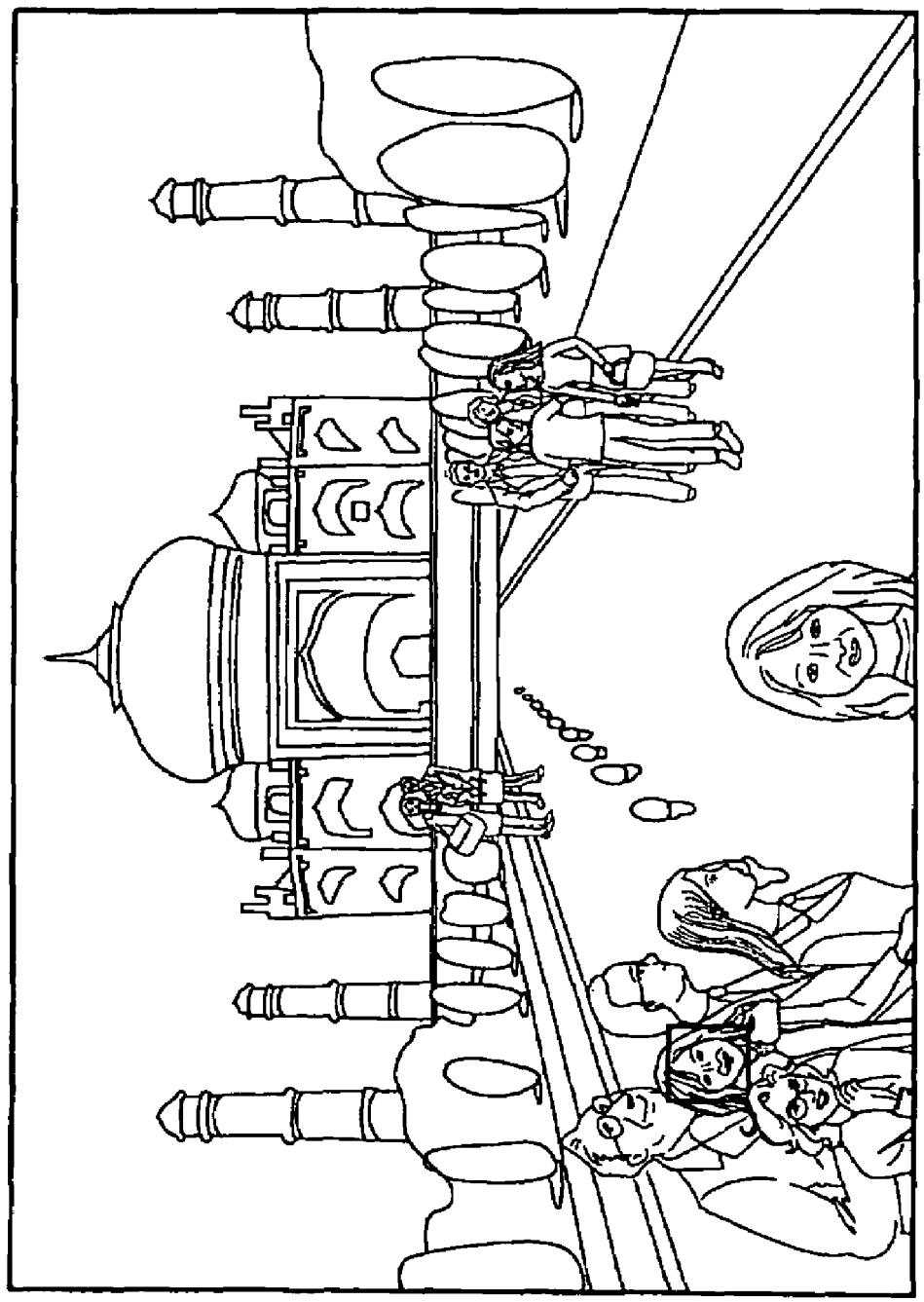
FIG. 19 shows a view showing the effect of the third embodiment.

FIG. 19 shows the effect of the imaging apparatus 12b. Even if a plurality of groups exist as shown in FIG. 19, the face (face circled by a rectangle of heavy line) closest to such group is selected based only on the position of the face included in the group positioned at the lower left of the image.

The cluster determining part 23 may be configured so as to select the selected cluster based on the center of the face points of the faces in each cluster. In this case, the center determining portion 19b acquires the center with respect to the face point contained in each cluster generated by the classifying part 22. The cluster determining part 23 determines the selected cluster based on the center in each cluster acquired by the center determining portion 19b. For instance, the cluster determining part 23 determines the cluster in which the coordinate of the center of the face contained in the cluster is closest to the middle point of the image as the selected cluster. The face determining portion 20b determines the face to be focused based on the center of the selected cluster.

The cluster determining part 23 may be configured to determine the selected cluster based on the face point of the face temporarily determined as the face to be focused on for each cluster. In this case, the determining part 18b temporarily determines the face to be focused on based only on the face contained in the cluster for each cluster generated by the classifying part 22. The cluster determining part 23 determines the selected cluster based on the face point in each cluster acquired by the determining part 18b. For instance, the cluster determining part 23 determines the cluster in which the coordinate of the temporary determined face point contained in the cluster is closest to the middle point of the image. That is, substantially, the cluster determining part 23 ultimately determines the face to be focused. In this case, the cluster determining part 23 may be configured to output the coordinate of the face point of the determined face to the distance measuring section 21.

When configured in such way, if the cluster selected by the cluster determining part 23 is not the cluster desired by the user (selected result of the cluster is presented to the user through a displaying section (not shown)), the user may select a different cluster as the selected cluster using the input section 13. In this case, the cluster selected by the user may be shifted based on the priority each time the input section 13 is operated. The priority is the order based on a predetermined reference decided by the cluster determining part 23.

As described above, the face to be focused (also referred to as "target face") is temporarily determined for every cluster, the ultimate target face is determined from the temporary target faces, the target face is presented to the user, and if it does not match the intention of the user, changes the target face to a different target face that is temporarily determined.

In place of the above configuration, the temporary target face may be presented to the user before the determining part 18b determines the ultimate target face from the temporary target faces, and the user may select the ultimate target face therefrom. The temporary target face is presented to the user by displaying a frame around the relevant face by way of the displaying section (not shown).

Alternatively, the classifying result of the cluster by the classifying part 22 may be presented to the user through the displaying section (not shown) before the target face is determined, and the user may determine the selected cluster and the determining part 18b may select the target face from the selected cluster determined by the user. In this case, the cluster determining part 23 does not perform the process of determining the selected cluster, and only performs the operation of outputting the determination result of the selected cluster by the user to the determining part 18b. Thus, the determining operation of the cluster determining part 23 may be turned ON/OFF by the optional operation.

An imaging apparatus 12c equipped with a focusing object determining section 16c will now be explained. The differences from the imaging apparatus 12b and the focusing object determining section 16b according to the third embodiment will be explained with regards to the imaging apparatus 12c and the focusing object determining section 16c.

Figure 20:
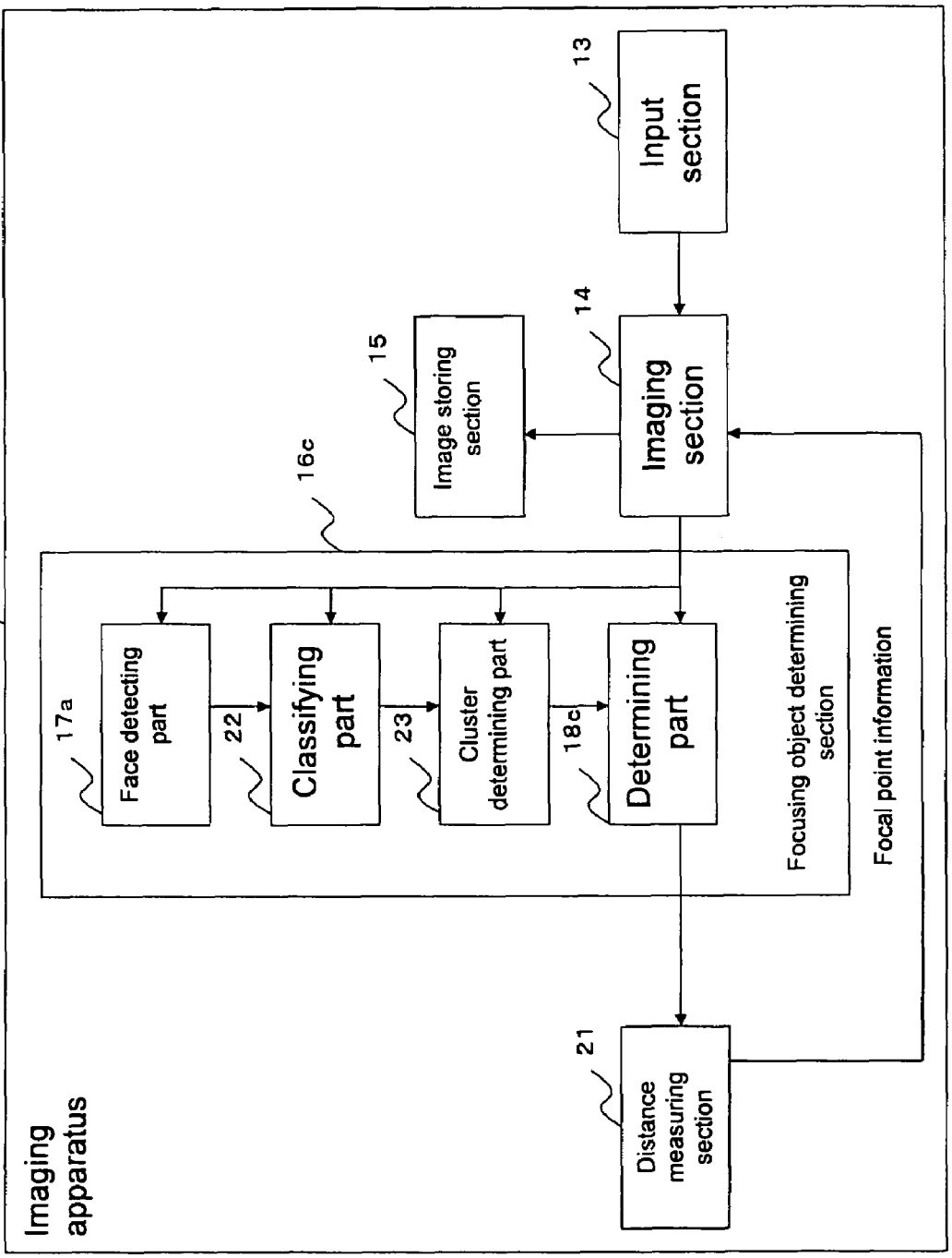
FIG. 20 shows functional blocks of a fourth embodiment.

FIG. 20 shows functional blocks of the imaging apparatus 12c. The imaging apparatus 12c differs from the imaging apparatus 12b according to the third embodiment in that the focusing object determining section 16c is arranged in place of the focusing object determining section 16b. Therefore, the explanation on the input section 13, the imaging section 14, the image storage section 15, and the distance measuring section 21 of the imaging apparatus 12c will be omitted.

The focusing object determining section 16c differs from the focusing object determining section 16b according to the third embodiment in that the determining part 18c is arranged in place of the determining part 18b. Therefore, the explanation on the face detecting part 17a, the classifying part 22, and the cluster determining part 23 is omitted.

The determining part 18c performs the process based on the face contained in the cluster (selected cluster) determined by the cluster determining part 23. The determining part 18c determines the face to be focused based on the size of the face. The determining part 18c, for example, determines the face of largest size of the faces included in the selected cluster as the face to be focused. Alternatively, the determining part 18c may determine the face of intermediate size of the faces contained in the selected cluster determined by the cluster determining part 23 as the face to be focused. In the following explanation, the determining part 18c determines the face of largest size as the face to be focused.

The operation example of the imaging apparatus 12c according to the fourth embodiment will now be explained. The operation of the imaging apparatus 12c is the same as the operation of the imaging apparatus 12b according to the third embodiment except for the content of the process of S27. Thus, only the content of the process of S27 will be explained for the operation example of the imaging apparatus 12c.

Figure 21:
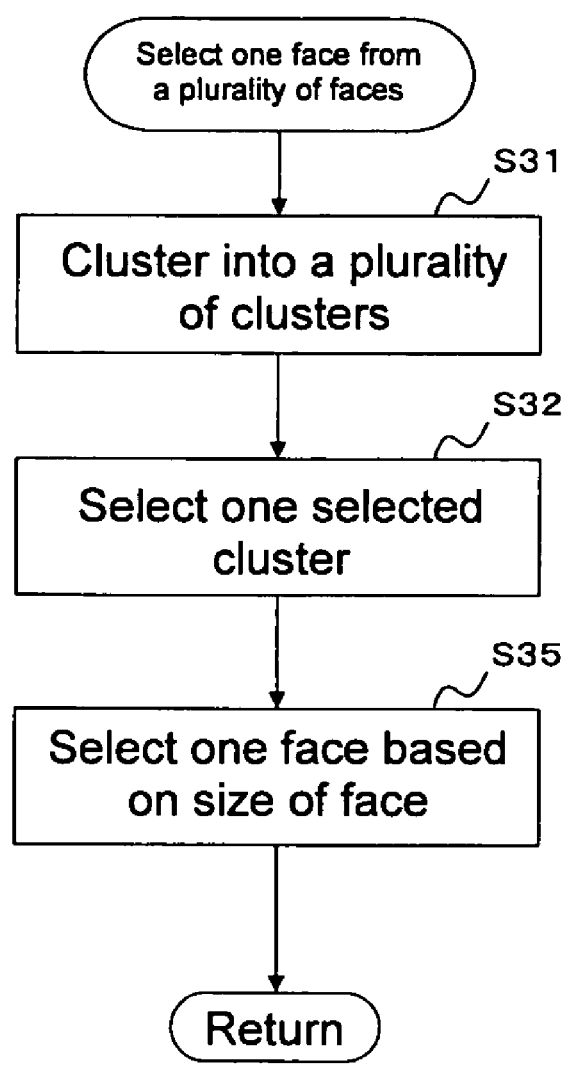
FIG. 21 shows a flowchart showing one part of an operation example of the fourth embodiment.

FIG. 21 shows a flowchart showing one part of the process of the focusing object determining part 16c according to the fourth embodiment, that is, the content of the process of S27 in FIG. 13.

When the process of S27 is started, the classifying part 22 clusters a plurality of face points detected by the face detecting part 17a into a plurality of clusters (S31). The cluster determining part 23 then selects one selected cluster out of a plurality of clusters generated by the classifying part 22 (S32). The determining part 18c then selects one face as the face to be focused based on the size of each face out of the faces included in the selected cluster selected in the process of S32 (S35).

According to the imaging apparatus 12c of the fourth embodiment, similar to the imaging apparatus 12b according to the third embodiment, if a plurality of groups exist in the image, the face to be focused is determined based only on the people in one of the groups.

Further, according to the imaging apparatus 12c of the fourth embodiment, the face to be focused is selected based on the size of the face out of the faces contained in one of the selected group. For the user, the face to be noticed may be the face closest to the imaging apparatus. Further, the face closest to the imaging apparatus tends to be the largest face in the image. Thus, according to the imaging apparatus 12c, the face assumed to be most noticed by the user is selected based on the size of the face out of the faces contained in one of the selected group. Therefore, in this case, the user does not need to manually focus on the face to be noticed. The face to be noticed the most does not need to be placed at the center of the frame or in the vicinity thereof as in the prior art.

The determining part 18c may be configured to perform the process based on the characteristic amount relating to each face included in the cluster determined by the cluster determining part 23. The determining part 18c acquires the characteristic amount relating to each face. The determining part 18c is configured to acquire the characteristic amount relating to each face based on the size of the face, the orientation of the face and the like. Further, the determining part 18c is configured to acquire the amount indicating the extent of face likeness as the characteristic amount for each face. The "amount indicating the extent of face likeness" is indicated using a value acquired in the face detecting process in the face detecting part 17a. Specifically, the value related to face likeness is used as the characteristic amount when the face detecting part 17a is configured to calculate the value related to face likeness of the image in a region when deciding whether or not a face is included within a certain region.

An imaging apparatus 12d equipped with a focusing object determining part 16d will now be explained. The difference from the imaging apparatus 12a and the focusing object determining section 16a according to the second embodiment will be explained with regards to the imaging apparatus 12d and the focusing object determining section 16d.

Figure 22:
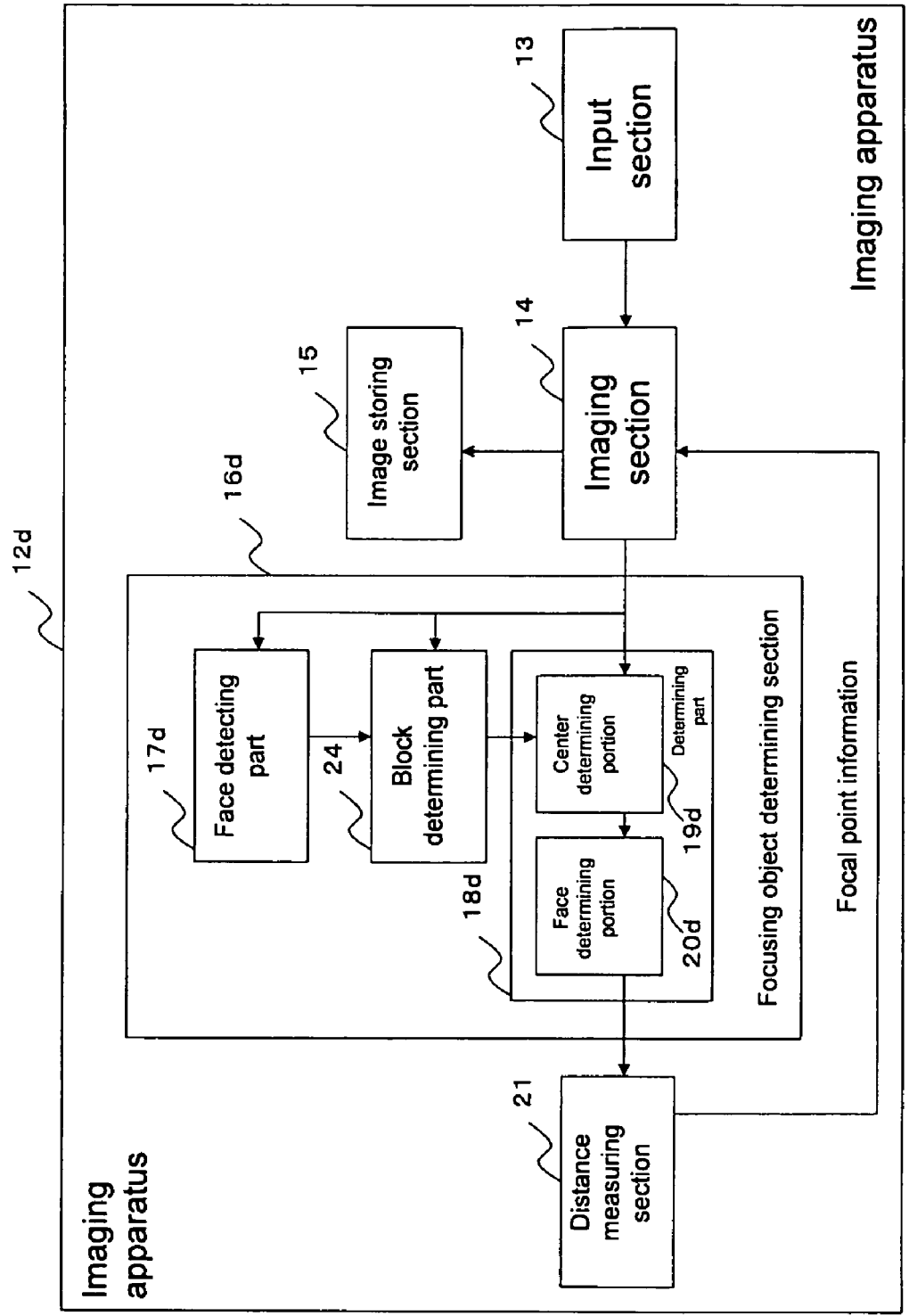
FIG. 22 shows functional blocks of a fifth embodiment.

FIG. 22 shows functional blocks of the imaging apparatus 12d. The imaging apparatus 12d differs from the imaging apparatus 12a according to the second embodiment in that the focusing object determining section 16d is arranged in place of the focusing object determining section 16a. Therefore, the explanation on the input section 13, the imaging section 14, the image storage section 15, and the distance measuring section 21 of the imaging apparatus 12d will be omitted.

The focusing object determining part 16d includes a face detecting part 17d, a block determining part 24 and a determining part 18d. Each function of the parts configuring the focusing object determining part 16d will now be explained.

Figure 23:
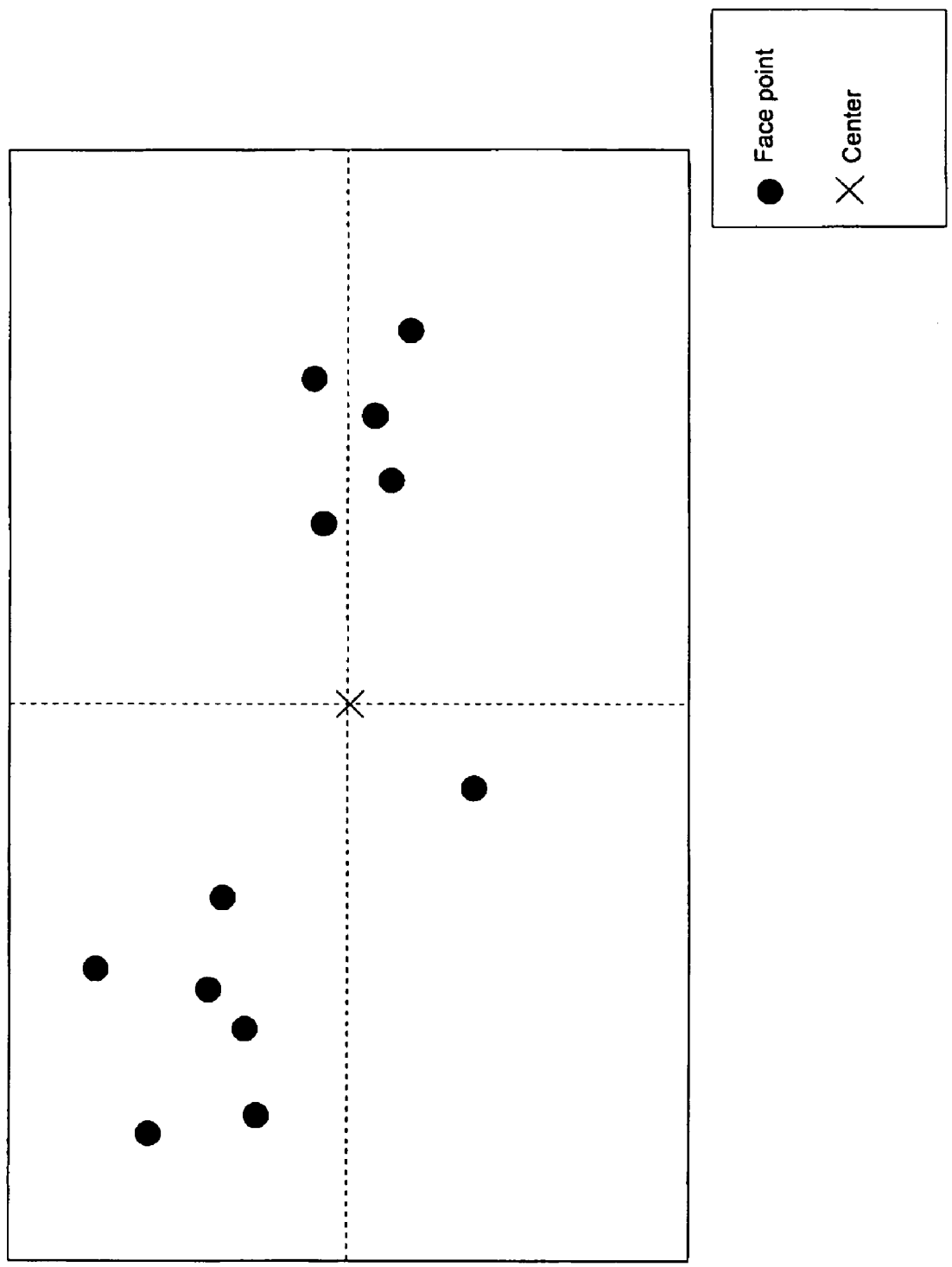
FIG. 23 shows an example of a focusing image divided into a plurality of blocks.

The face detecting part 17d differs from the face detecting part 17a according to the second embodiment in that the face region is detected for every plurality of blocks in advance when detecting face region from the image for focusing. FIG. 23 shows an example of the image for focusing divided into a plurality of blocks. As shown in FIG. 23, the image for focusing is divided into a plurality of blocks (in FIG. 23, a rectangle image (frame) is divided into four blocks by two line segments parallel to the longitudinal axis and the lateral axis and passing through the middle point of the image but may be divided into any number of blocks). The kind of blocks unto which the image for focusing is divided into is stored in the face detecting part 17d.

The face detecting part 17d detects the face for each of a plurality of blocks. The face detecting part 17d outputs the detection result for every block to the block determining part 24.

The block determining part 24 selects the block (i.e., block containing the face to be focused, hereinafter referred to as "selected block") for determining the face to be focused. That is, the coordinate output to the distance measuring section 21 becomes the coordinate of the face point of the face detected in the selected block determined by the block determining part 24.

The block determining part 24 may determine the selected block based on any reference such as number of faces detected in each block, characteristic amount related to the face detected in the block and the like. For instance, the block determining part 24 determines the block in which most faces are detected in each block as the selected block. If the block determining part 24 is configured in this way, in a situation as shown in FIG. 23, the block on the upper left is determined as the selected block by the block determining part 24.

Further, the block determining part 24 may determine the block in which the sum of the characteristic amount related to the face contained in each block is the largest as the selected block. As a method of calculating the characteristic amount related to the face, the method similar to the method explained in the above described embodiments may be applied.

The determining part 18d differs from the determining part 18a in that the process is performed based not on the face contained in the entire image imaged by the imaging section 14 but based on the face contained in the selected block determined by the block determining part 24. The determining part 18d performs a process similar to the determining part 18a.

Figure 24:
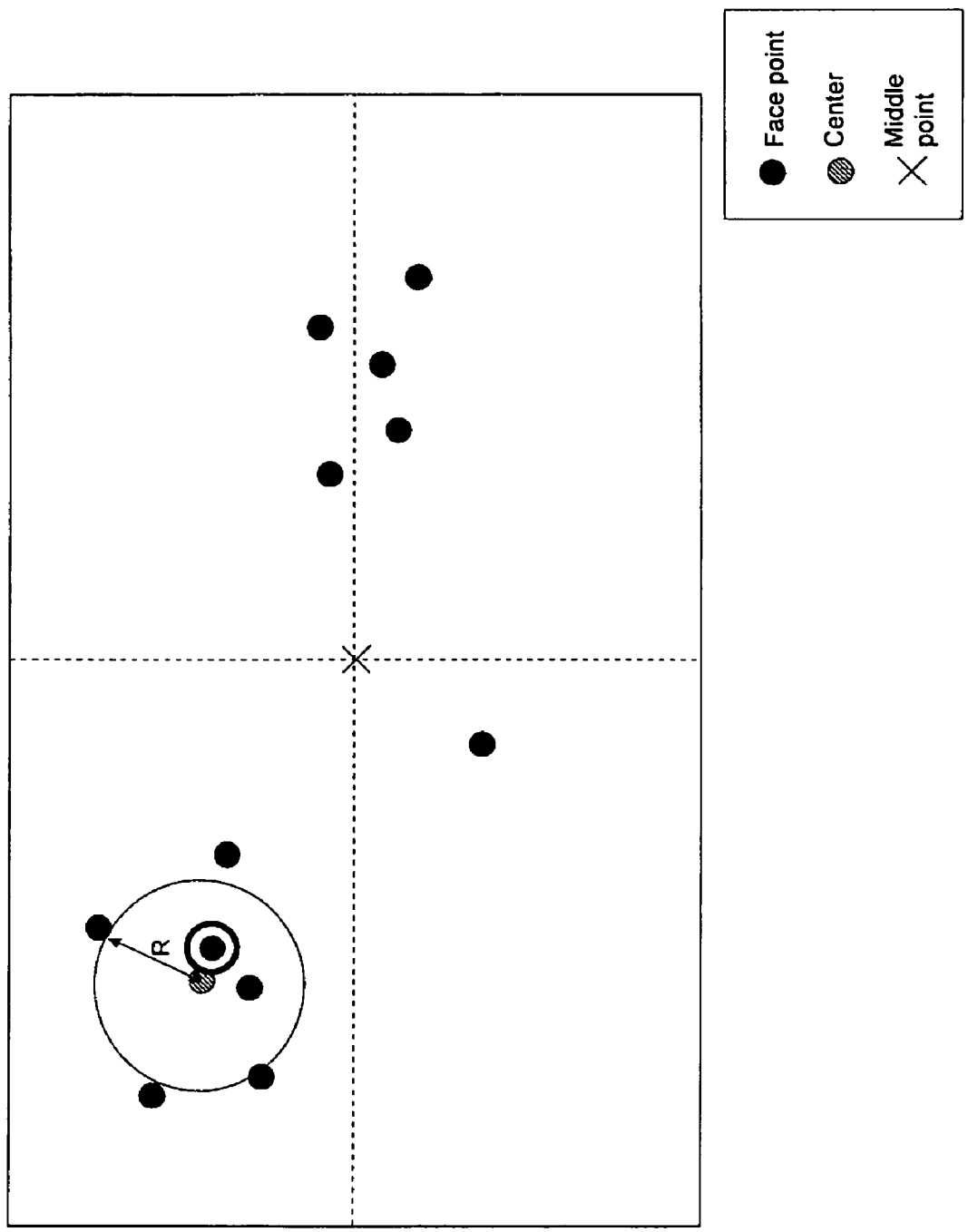
FIG. 24 shows a processing example of a determining part according to the fifth embodiment.

FIG. 24 shows an example of a process by the determining part 18d. The center of the face is acquired in the block (selected block) on the upper left selected by the block determining part 24. Based on the acquired center, one face point (face point encircled with a circle of heavy line) is selected according to a predetermined reference (close to the middle point of the image (frame)).

The operation example of the imaging apparatus 12d according to the fifth embodiment will now be explained. The operation of the imaging apparatus 12d is the same as the operation of the imaging apparatus 12a according to the second embodiment except for the content of the process of S19. Thus, only the content of the process of S19 will only be explained for the operation example of the imaging apparatus 12d.

Figure 25:
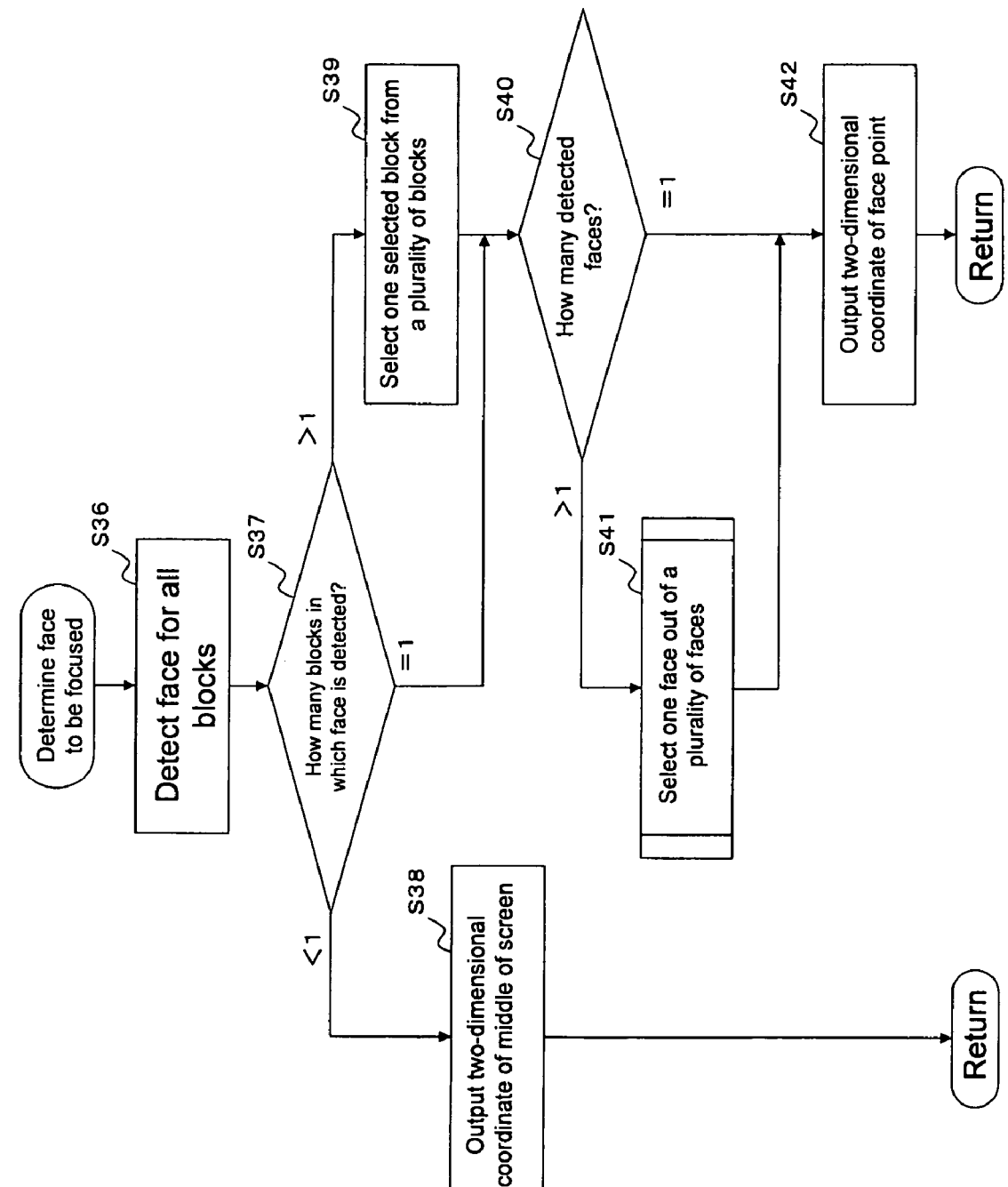
FIG. 25 shows a flowchart showing one part of an operation example of the fifth embodiment.

FIG. 25 shows a flowchart showing one part of the focusing object determining section 16d according to the fifth embodiment, that is, the content of the process of S19 in FIG. 12. Thus, in the fifth embodiment, the process shown in FIG. 25 is executed in S19 in place of the process shown in FIG. 13 applied in the second embodiment.

When the process of S19 is started, the face detecting part 17d detects the face for every block (S36). The block determining part 24 then investigates the number of blocks in which the face is detected. If the number of blocks in which the face is detected is less than 1 (S37: <1), that is, if 0, the block determining part 24 notifies the determining part 18d that the face is not present. The determining part 18d then outputs the two-dimensional coordinate of the middle of the image (frame) to the distance measuring section 21 (S38).

If the number of blocks in which the face is detected is greater than 1 (S37: >1), the block determining part 24 selects one selected block from a plurality of blocks in which the face is detected (S39). If the block in which the face is detected is one (S37: =1), or after the process of S39, the determining part 18d investigates the number of faces contained in the selected block selected by the block determining part 24. If the number of faces is greater than one (S40: >1), that is, if a plurality of faces are detected in the selected block, the determining part 18d selects one face from a plurality of faces (S41). The process of S41 is the process similar to the flowchart shown in FIG. 14. However, it differs from the second embodiment in that the object to be processed is the selected block rather than the entire image.

Referring back to FIG. 25, if the detected face is one (S40: =1), or after the process of S41, the determining part 18d outputs the two-dimensional coordinate of the face point of one face to the distance measuring section 21 (S42). The one face is the only detected face when the number of detected faces is one and is the selected face when after the process of S41. After such process, the processes after S20 in FIG. 12 are performed.

According to the imaging apparatus 12d of the fifth embodiment, the image for focusing is divided into a plurality of blocks and one selected block containing the face to be focused is selected from a plurality of blocks. The face to be focused is selected from the one selected block. Thus, in the imaging apparatus 12d according to the fifth embodiment, an effect similar to the third embodiment is obtained. Specifically, if a plurality of groups are present in the image, theses groups are roughly divided by blocks. The face to be focused is selected based on the group or the face of one part of the group included in one selected block selected according to a predetermined reference.

In the imaging apparatus 12d according to the fifth embodiment, the process of clustering is not executed differently from the imaging apparatus 12b according to the third embodiment. Thus, in the imaging apparatus 12d according to the fifth embodiment, high-speed process can be performed compared to the imaging apparatus 12b according to the third embodiment.

The determining part 18d may be configured similar to the determining part 18b according to the third embodiment. In this case, the determining part 18d is configured so as to be different from the determining part 18b in that the process is performed based not only on the face contained in the selected cluster determined by the cluster determining part 23 but based on the face contained in the selected block determined by the block determining part 24. That is, it is configured so that the classification of the cluster with the selected block rather than the entire image as the target, determination of the selected cluster and the like are performed. In this case, the determining part 18d is configured so as to perform the process similar to the determining part 18b other than the above points.

Due to such configuration, clustering with all the faces in the screen as the target does not need to be performed. That is, clustering only needs to be executed on the faces contained in the selected block. Thus, if multiple groups are contained in the screen, high-speed process can be performed compared to the imaging apparatus 12b according to the third embodiment. Further, compared to the normal imaging apparatus 12d according to the fifth embodiment, the cluster including the face to be focused and the face to be focused can be more accurately selected.

An imaging apparatus 12e equipped with a focusing object determining part 16e will now be explained. The difference from the imaging apparatus 12a and the focusing object determining section 16a according to the second embodiment will be explained with regards to the imaging apparatus 12e and the focusing object determining section 16e.

Figure 26:
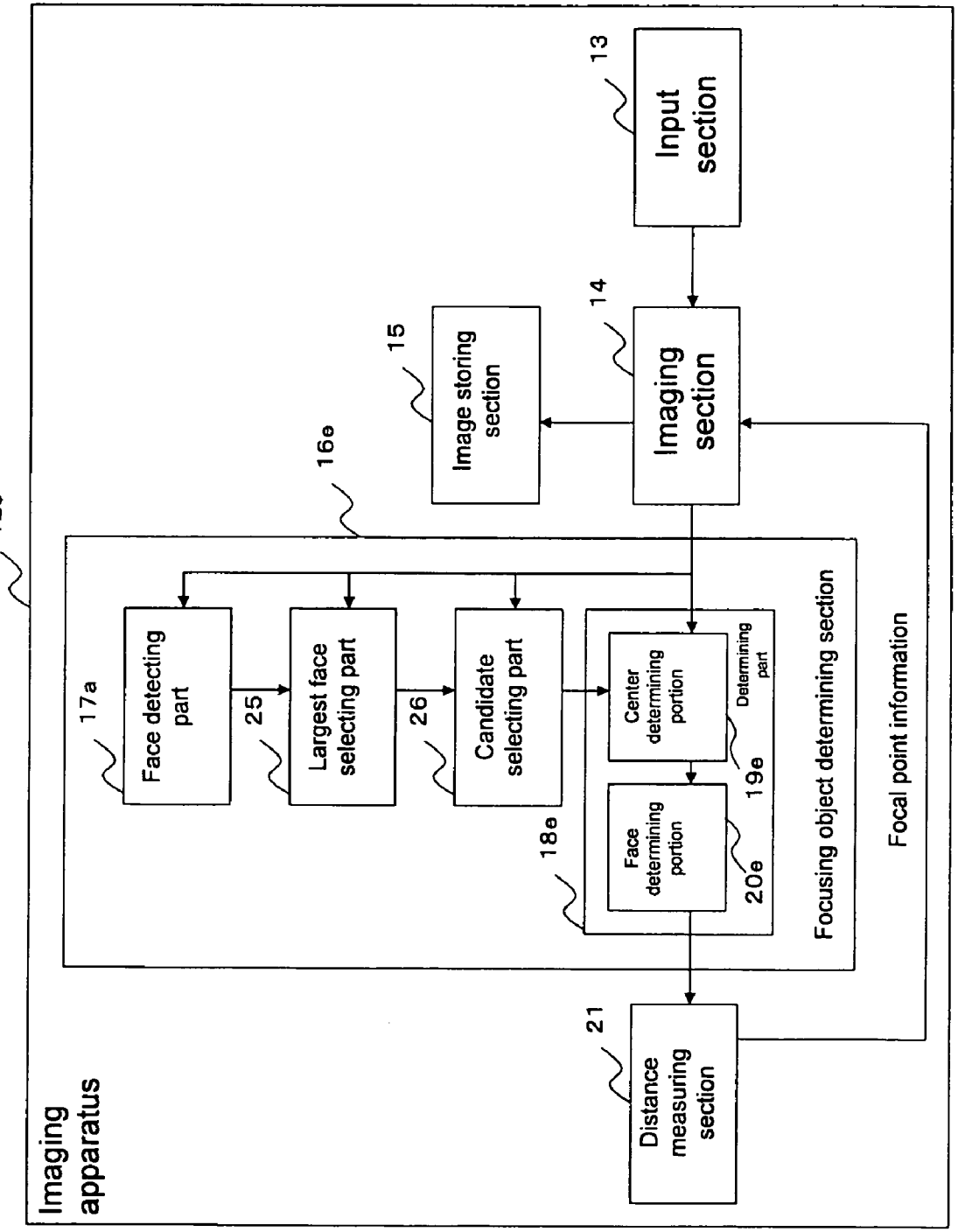
FIG. 26 shows functional blocks of a sixth embodiment.

FIG. 26 shows functional blocks of the imaging apparatus 12e. The imaging apparatus 12e differs from the imaging apparatus 12a according to the second embodiment in that the focusing object determining section 16e is arranged in place of the focusing object determining section 16a. Therefore, the explanation on the input section 13, the imaging section 14, the image storage section 15, and the distance measuring section 21 of the imaging apparatus 12e will be omitted.

The focusing object determining section 16e includes a face detecting part 17a, a largest face selecting part 25, a candidate selecting part 26, and a determining part 18e. Each function part configuring the focusing object determining section 16e will now be explained. However, the face detecting part 17a of the focusing object determining section 16e has a configuration same as the face detecting part 17a of the focusing object determining section 16a according to the second embodiment, and thus the explanation thereof is omitted.

The largest face selecting part 25 selects the face of largest size (largest face) out of a plurality of faces detected by the face detecting part 17a. The largest face selecting part 25 performs selection based on the size of the face rectangle if the face rectangle is used in the face detecting part 17a. Further, the largest face selecting part 25 performs selection based on the size of the pattern if pattern matching is implemented in the face detecting part 17a. The largest face selecting part 25 may be configured so as to select the largest face through any other method. The largest face selecting part 25 outputs the information on the selected largest face (e.g., coordinate of face point, size of face) to the candidate selecting part 26.

Figure 27:
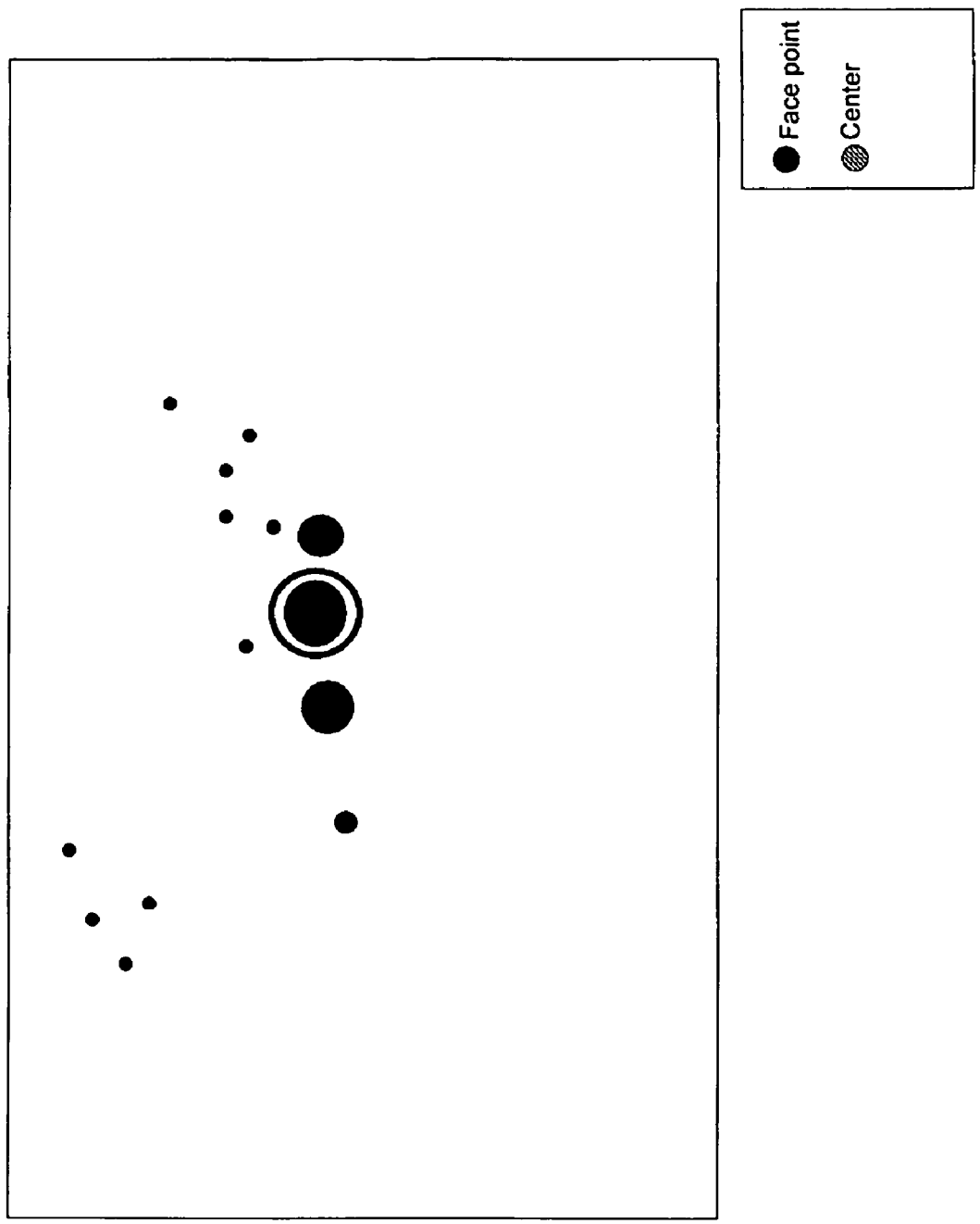
FIG. 27 shows a processing example of a largest face selecting part.

FIG. 27 shows a processing example of the largest face selecting part 25. In FIG. 27, the size of each face point shows the size of the face corresponding to each face point. The face point circled with a thick frame is selected as the largest face through the process of largest face selecting part 25.

The candidate selecting part 26 selects the candidates for the face to be focused based on the size of the largest face selected by the largest face selecting part 25. In other words, the candidate selecting part 26 determines the face to be processed of the determining part 18e.

The candidate selecting part 26 selects the largest face selected by the largest face selecting part 25, and other faces having a size within a predetermined range from the size of the largest face as the candidates for the target face. The size of a predetermined range indicates a size smaller than the largest face by few percent to several dozen percent. Further, the size of the predetermined range indicates a size of greater than or equal to half, or a size greater than or equal to ⅔ the largest face.

Figure 28:
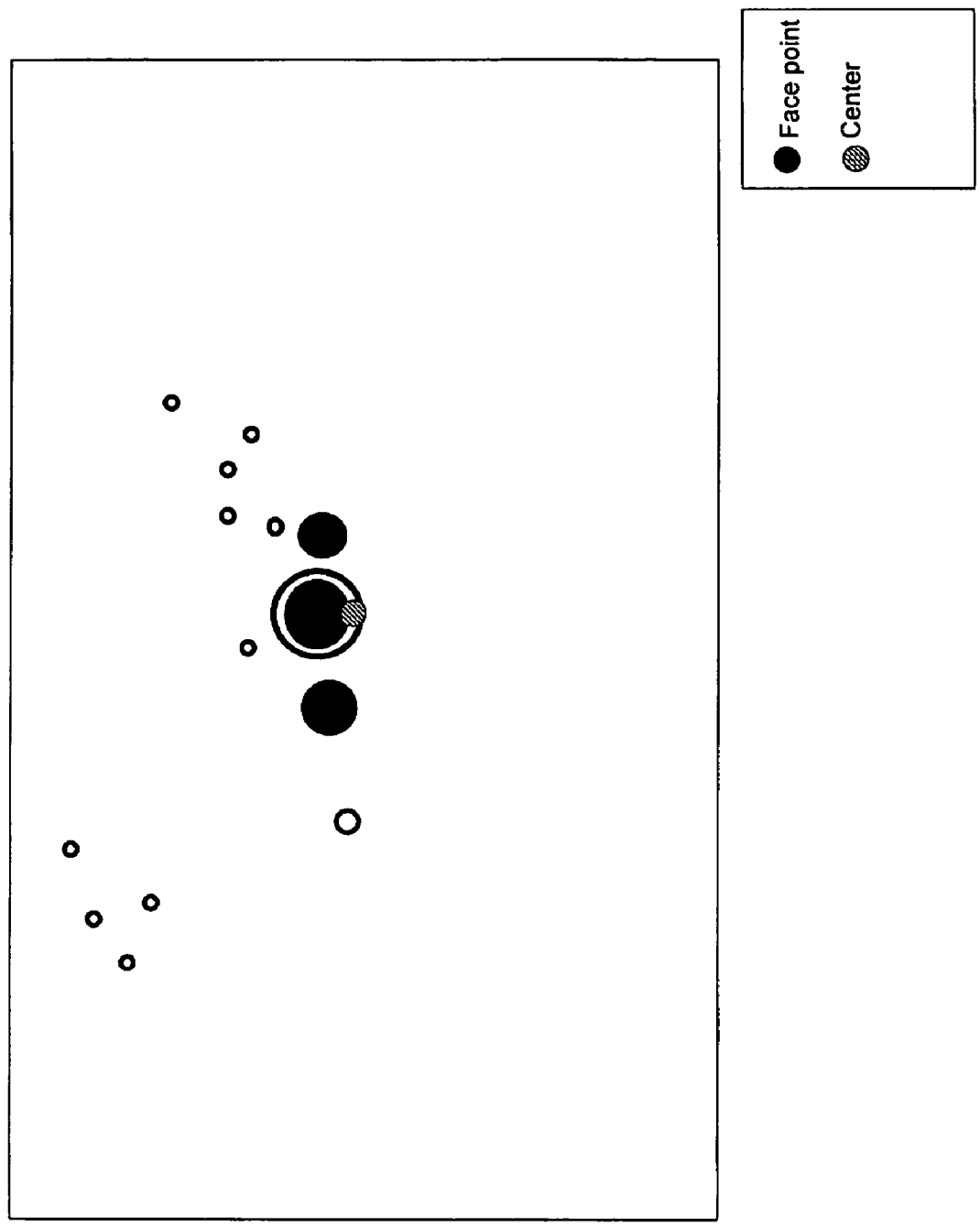
FIG. 28 shows a processing example of a candidate selecting part.

FIG. 28 shows a processing example of the candidate selecting part 26. In FIG. 28, the white circles indicate the face points that are not selected by the candidate selecting part 26. The black circles indicate the face points of other faces selected by the candidate selecting part 26. The face points encircled by a thick frame indicate the face point of the largest face selected by the determining part 18e.

The determining part 18e differs from the determining part 18a in that the process is performed based not on the face contained in the entire image imaged by the imaging section 14 but based on the face included in the candidate selected by the candidate selecting part 26. The determining part 18e performs a process similar to the determining part 18a.

The process of the determining part 18e will be explained using FIG. 28. The determining part 18e selects the face to be focused based on three face points selected by the candidate selecting part 26. Here, the center determining portion 19e of the determining part 18e acquires the center (shaded circle) of the three face points. The face determining portion 20e of the determining part 18e selects one face point (face point (largest face) circled by a thick frame) according to a predetermined reference (closest to the center (middle point) of the image (frame)).

The operation example of the imaging apparatus 12e according to the sixth embodiment will now be explained. The operation of the imaging apparatus 12e is the same as the operation of the imaging apparatus 12a according to the second embodiment except for the content of the process of S27. Thus, explanation on only the content of the process of S27 will be made for the operation example of the imaging apparatus 12e.

Figure 29:
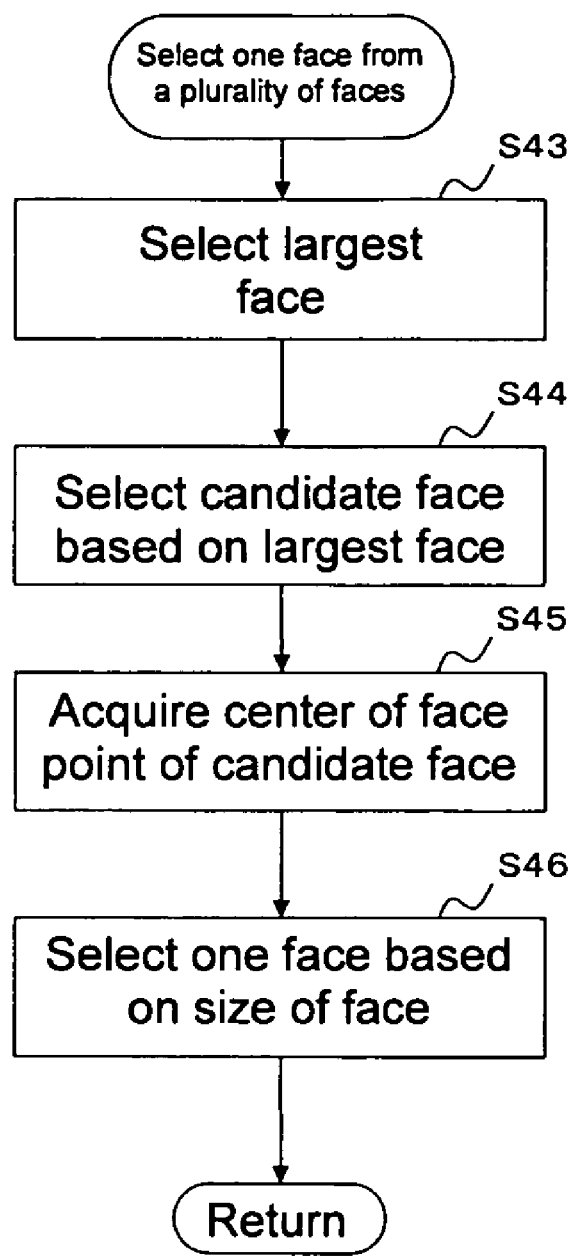
FIG. 29 shows a flowchart showing one part of an operation example of the sixth embodiment.

FIG. 29 shows a flowchart showing one part of the process of the focusing object determining section 16e according to the sixth embodiment, that is, the content of the process of S27 in FIG. 13. The sixth embodiment differs from the second embodiment in that the process shown in FIG. 29 is executed in place of the process shown in FIG. 14 with respect to S27.

When the process of S27 is started, the largest face selecting part 25 selects the largest face out of a plurality of faces detected by the face detecting part 17a (S43). The candidate selecting part 26 then selects the face to be the candidate based on the size of the face (largest face) selected by the largest face selecting part 25 (S44).

The center determining portion 19e of the determining part 18e then acquires the center of the face point based on the face to be the candidate selected by the candidate selecting part 26 (largest face, and at least one other face having the size belonging to a predetermined range with the largest face as reference) (S45). The face determining portion 20e of the determining part 18e selects one face, that is, the face to be focused based on the acquired center (S46). According to the above processes, the largest face is determined as the target face if the face corresponding to other faces is not detected.

According to the imaging apparatus 12e of the sixth embodiment, the face to be focused is selected based only on the faces which are at least a certain size. The certain size is decided based on the size of the largest face.

Therefore, the person appearing as a background, that is, the face of the person the user does not recognize as a subject is prevented from being included as the object to be processed. Therefore, the precision of the process of selecting the cluster including the face to be focused, the process of acquiring the center based on the face included in the cluster, and the process of selecting the face to be focused is enhanced.

The largest face selecting part 25 may be configured so as to perform the selection based on the size of the region of the skin color of the detected face.

Further, the second to the sixth embodiments may be configured to include the face detecting part 5 according to the first embodiment in place of the face detecting part 17a or 17d of the second to sixth embodiments.

The object determining device is mountable on a video camera or a still camera that performs photography based on focal length or exposure optimized to the subject.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

What is claimed is:

1. An object determining device comprising:
   a detecting part for detecting a face of a person from an input image;
   a determining part for determining, when a plurality of faces of people are detected by the detecting part, a face to be focused and/or subject on which to perform exposure control when performing imaging from the plurality of faces of people based on positions of the plurality of faces of people;
   a center determining portion for determining a center of the positions of the plurality of faces of people based on the positions of the plurality of faces of people; and
   a face determining portion for determining a target face based on the position of the center.

2. An object determining device comprising:
   a frame acquiring section for acquiring an image of a predetermined frame as an image to be processed from an input time-series image including a plurality of frames;
   a detecting part for detecting a face of a person from the image to be processed;
   a determining part for determining, when a plurality of faces of people are detected by the detecting part, a face to be focused and/or subject on which to perform exposure control when performing imaging from the plurality of faces of people based on positions of the plurality of faces of people;
   a center determining portion for determining a center of the positions of the plurality of faces of people based on the positions of the plurality of faces of people; and
   a face determining portion for determining a target face based on the position of the center.

3. The object determining device according to claim 1 or 2, wherein the center determining portion determines a center of a polygon circumscribing the positions of the plurality of faces of people as the center.

4. The object determining device according to claim 1 or 2, wherein the center determining portion determines a barycenter of the positions of the plurality of faces of people as the center.

5. The object determining device according to claim 1 or 2, wherein the face determining portion determines the face of a person positioned closest to the center as the target face.

6. The object determining device according to claim 1 or 2, wherein the face determining portion determines the target face according to a predetermined reference from faces positioned within a predetermined distance from the center.

7. The object determining device according to claim 1 or 2, wherein the determining part determines a face positioned the lowest of the plurality of faces of people as the target face.

8. An object determining device comprising:
   a detecting part for detecting a face of a person from an input image; and
   a determining part for determining, when a plurality of faces of people are detected by the detecting section, a face of a person positioned in the middle, with the number of detected faces as a reference, as a face to be focused and/or subject on which to perform exposure control when performing imaging.

9. An object determining device comprising:
   a frame acquiring section for acquiring an image of a predetermined frame as an image to be processed from an input time-series image including a plurality of frames;
   a detecting part for detecting a face of a person from the image to be processed; and
   a determining part for determining, when a plurality of faces of people are detected by the detecting part, a face of a person positioned in the middle, with the number of detected faces as a reference, as the face to be focused and/or face on which to perform exposure control when performing imaging.

10. The object determining device according to claim 1, 2, 8 or 9, further comprising:
    a classifying part for classifying, when a plurality of faces of people are detected by the detecting part, the plurality of detected faces of people into a plurality of clusters based on respective positions; and
    a cluster determining part for determining a selected cluster to determine the target face from the plurality of clusters; wherein
    the determining part determines the target face based on a face of a person included in the selected cluster.

11. The object determining device according to claim 1, 2, 8 or 9, further comprising a displaying section for displaying the face of a person determined by the determining part distinctly from other faces.

12. A computer readable medium containing a program for an information processing device, said program when executed by the processing device causes the processing device to perform a method comprising the steps of:
    detecting a face of a person from an input image;
    determining, when a plurality of faces of people are detected, a face to be focused and/or face on which to perform exposure control when performing imaging from a plurality of faces of people based on positions of the plurality of faces of people;
    determining a center of the positions of the plurality of faces of people based on the positions of the plurality of faces of people; and
    determining a target face based on the position of the center.

13. A computer readable medium containing a program for an information processing device, said program when executed by the processing device causes the processing device to perform a method comprising the steps of:
- detecting a face of a person from an input image; and
- determining, when a plurality of faces of people are detected, a face of a person positioned in the middle, with the number of detected faces as a reference, as a face to be focused and/or face on which to perform exposure control when performing imaging.

14. An object determining device comprising:
- a face detecting part for detecting, from an image imaged based on arbitrary focal point information as an image to be processed, a face of a person based on a relative value of statistics in a plurality of characteristic regions produced by contour or parts of a face of a person from the image to be processed; and
- a determining part for determining a subject to be focused and/or subject on which to perform exposure control when performing imaging based on the face detected by the face detecting part,
- wherein when a plurality of faces of people are detected by the face detecting part, the determining part determines a face of a person positioned in the middle, with the number of detected faces as a reference, as the face to be focused and/or face on which to perform exposure control when performing imaging.

15. An object determining device comprising:
- a frame acquiring part for acquiring an image of a predetermined frame as an image to be processed from a time-series image including a plurality of frames imaged based on arbitrary focal point information;
- a face detecting part for detecting a face of a person based on a relative value of statistics in a plurality of characteristic regions produced by contour or parts of a face of a person from the image to be processed; and
- a determining part for determining a subject to be focused and/or subject on which to perform exposure control when performing imaging based on the face detected by the face detecting part,
- wherein when a plurality of faces of people are detected by the face detecting part, the determining part determines a face of a person positioned in the middle, with the number of detected faces as a reference, as the face to be focused and/or face on which to perform exposure control when performing imaging.

16. A computer readable medium containing a program for an information processing device, said program when executed by the processing device causes the processing device to perform a method comprising the steps of:
- acquiring an image of a predetermined frame as an image to be processed from an input time-series image including a plurality of frames;
- detecting a face of a person from the image to be processed;
- determining, when a plurality of faces of people are detected, a face to be focused and/or subject on which to perform exposure control when performing imaging from the plurality of faces of people based on positions of the plurality of faces of people;
- determining a center of the positions of the plurality of faces of people based on the positions of the plurality of faces of people; and
- determining a target face based on the position of the center.

17. A computer readable medium containing a program for an information processing device, said program when executed by the processing device causes the processing device to perform a method comprising the steps of:
- detecting a face of a person from an input image; and
- determining, when a plurality of faces of people are detected, a face of a person positioned in the middle, with the number of detected faces as a reference, as a face to be focused and/or subject on which to perform exposure control when performing imaging.

18. A computer readable medium containing a program for an information processing device, said program when executed by the processing device causes the processing device to perform a method comprising the steps of:
- acquiring an image of a predetermined frame as an image to be processed from an input time-series image including a plurality of frames;
- detecting a face of a person from the image to be processed; and
- determining, when a plurality of faces of people are detected, a face of a person positioned in the middle, with the number of detected faces as a reference, as the face to be focused and/or face on which to perform exposure control when performing imaging.

19. A computer readable medium containing a program for an information processing device, said program when executed by the processing device causes the processing device to perform a method comprising the steps of:
- acquiring an image of a predetermined frame as an image to be processed from a time-series image including a plurality of frames imaged based on arbitrary focal point information;
- detecting a face of a person based on a relative value of statistics in a plurality of characteristic regions produced by contour or parts of a face of a person from the image to be processed; and
- determining a subject to be focused and/or subject on which to perform exposure control when performing imaging based on the detected face,
- wherein when a plurality of faces of people are detected, the determining step determines a face of a person positioned in the middle, with the number of detected faces as a reference, as the face to be focused and/or face on which to perform exposure control when performing imaging.

* * * * *